US011455125B2

(12) United States Patent
Mangione-Tran

(10) Patent No.: US 11,455,125 B2
(45) Date of Patent: *Sep. 27, 2022

(54) DETECTION AND REMEDIATION OF MEMORY LEAKS

(71) Applicant: ServiceNow, Inc., Santa Clara, CA (US)

(72) Inventor: Carmine Mangione-Tran, San Diego, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/065,165

(22) Filed: Oct. 7, 2020

(65) Prior Publication Data
US 2021/0019056 A1 Jan. 21, 2021

Related U.S. Application Data

(63) Continuation of application No. 16/406,941, filed on May 8, 2019, now Pat. No. 10,802,765, which is a (Continued)

(51) Int. Cl.
G06F 11/00 (2006.01)
G06F 3/06 (2006.01)
(Continued)

(52) U.S. Cl.
CPC .......... G06F 3/067 (2013.01); G06F 3/0608 (2013.01); G06F 3/0652 (2013.01);
(Continued)

(58) Field of Classification Search
CPC ...... G06F 3/067; G06F 3/0608; G06F 3/0652; G06F 9/5016; G06F 9/5022;
(Continued)

(56) References Cited

U.S. PATENT DOCUMENTS 6,728,738 B2 4/2004 Wolczko et al.
6,816,898 B1 11/2004 Scarpelli
(Continued)

OTHER PUBLICATIONS

Serrano, Manuel et al.; "Understanding Memory Allocation of Schme Programs", Hewlett-Packard Laboratories, HP Labs Technical Reports, HPL-2000-62, Date Unknown, downloaded Oct. 18, 2016, rittp:/lwww.hpl.hp.com/techreports/2000/HPL-2000-62.html, 1 pp.

(Continued)

Primary Examiner — Jonathan D Gibson
(74) Attorney, Agent, or Firm — Fletcher Yoder PC

(57) ABSTRACT

Detecting and remediating memory leaks associated with an application environment can include monitoring allocations of memory from a managed memory space to respective operations to produce memory allocation data and monitoring deallocations of memory to at least some of the respective operations to produce memory deallocation data. A trend in memory leakage can be determined based on samples of the memory allocation or deallocation data. A projection of future memory usage by operations associated with the trend can be determined using binned sets of the memory allocation data and the memory deallocation data. A predicted time at which memory usage by the operations associated with the trend is expected to exceed a threshold can be determined using the projection of future memory usage. A remediation action can be performed before the predicted time to prevent a memory constraint from occurring with respect to the application environment. The application environment can be configured to automatically allocate unallocated portions of memory to execute operations and periodically deallocate unused allocated memory.

20 Claims, 9 Drawing Sheets

Related U.S. Application Data continuation of application No. 15/334,382, filed on Oct. 26, 2016, now Pat. No. 10,289,347.

(60) Provisional application No. 62/327,540, filed on Apr. 26, 2016.

(51) Int. Cl.

| | | |
|---|---|---|
| *G06F 11/30* | (2006.01) | |
| *G06F 11/34* | (2006.01) | |
| *G06F 9/50* | (2006.01) | |
| *G06F 11/07* | (2006.01) | |
| *G06F 12/00* | (2006.01) | |
| *G06F 12/02* | (2006.01) | |

(52) U.S. Cl.
CPC .......... *G06F 9/5016* (2013.01); *G06F 9/5022* (2013.01); *G06F 11/079* (2013.01); *G06F 11/0778* (2013.01); *G06F 11/3034* (2013.01); *G06F 11/3433* (2013.01); *G06F 12/00* (2013.01); *G06F 12/0253* (2013.01); *G06F 2212/7205* (2013.01)

(58) Field of Classification Search
CPC .. G06F 11/3034; G06F 11/3433; G06F 12/00; G06F 12/0253; G06F 2212/7205; G06F 11/079; G06F 11/0778
See application file for complete search history.

(56) References Cited

U.S. PATENT DOCUMENTS

| | | | |
|---|---|---|---|
| 7,020,706 B2 | 3/2006 | Cates | |
| 7,234,080 B2 | 6/2007 | Cirne et al. | |
| 7,257,692 B2 | 8/2007 | Schumacher | |
| 7,398,369 B2 | 7/2008 | Dickenson | |
| 7,487,321 B2 | 2/2009 | Muthiah et al. | |
| 7,496,795 B2 | 2/2009 | Minshall et al. | |
| 7,716,353 B2 | 5/2010 | Golovinsky | |
| 7,769,718 B2 | 8/2010 | Murley | |
| 7,827,538 B2 | 11/2010 | Trotter | |
| 7,925,981 B2 | 4/2011 | Pourheidar | |
| 7,991,961 B1* | 8/2011 | Tsai .................... | G06F 12/0253 711/132 |
| 8,402,127 B2 | 3/2013 | Solin | |
| 8,612,408 B2 | 12/2013 | Trinon | |
| 8,832,652 B2 | 9/2014 | Mueller | |
| 8,904,359 B2 | 12/2014 | Kao et al. | |
| 9,065,783 B2 | 6/2015 | Ding | |
| 9,098,322 B2 | 8/2015 | Apte | |
| 9,122,552 B2 | 9/2015 | Whitney | |
| 9,317,327 B2 | 4/2016 | Apte | |
| 9,363,252 B2 | 6/2016 | Mueller | |
| 9,535,737 B2 | 1/2017 | Joy | |
| 9,645,833 B2 | 5/2017 | Mueller | |
| 9,654,473 B2 | 5/2017 | Miller | |
| 9,766,935 B2 | 9/2017 | Kelkar | |
| 9,804,322 B1 | 10/2017 | Kelkar | |
| 9,819,729 B2 | 11/2017 | Moon | |
| 9,824,005 B1 | 11/2017 | Helliwell et al. | |
| 10,019,249 B1 | 7/2018 | Karppanen | |
| 10,289,347 B2 | 5/2019 | Mangione-Tran | |
| 10,346,237 B1* | 7/2019 | Surendra Rao ....... | G06F 11/008 |
| 2004/0078540 A1 | 4/2004 | Cirne | |
| 2004/0133895 A1 | 7/2004 | Dahlstedt et al. | |
| 2004/0172579 A1 | 9/2004 | Fu | |
| 2005/0028140 A1 | 2/2005 | Ayachitula et al. | |
| 2005/0081190 A1 | 4/2005 | Betancourt et al. | |
| 2005/0204342 A1 | 9/2005 | Broussard | |
| 2005/0273568 A1 | 12/2005 | Blandy | |
| 2006/0048017 A1 | 3/2006 | Anerousis et al. | |
| 2006/0080364 A1 | 4/2006 | Lake | |
| 2006/0277440 A1 | 12/2006 | Minshall et al. | |
| 2007/0061541 A1 | 3/2007 | Lin | |
| 2007/0136402 A1 | 6/2007 | Grose et al. | |
| 2008/0270994 A1 | 4/2008 | Li et al. | |
| 2008/0178189 A1 | 7/2008 | Findeisen et al. | |
| 2008/0209404 A1 | 8/2008 | Brady | |
| 2008/0301504 A1 | 12/2008 | Chen et al. | |
| 2009/0228870 A1 | 9/2009 | Kao et al. | |
| 2011/0066897 A1 | 3/2011 | Bumgarner et al. | |
| 2011/0252276 A1* | 10/2011 | Tsai .................... | G06F 11/0715 714/16 |
| 2012/0216076 A1* | 8/2012 | Macik ................ | G06F 11/3612 714/38.1 |
| 2013/0088501 A1 | 4/2013 | Fell | |
| 2013/0339568 A1 | 12/2013 | Corrie | |
| 2014/0067912 A1 | 3/2014 | Vutukoori et al. | |
| 2014/0068351 A1 | 3/2014 | Rhee et al. | |
| 2014/0181024 A1* | 6/2014 | Becker .................. | G06F 16/27 707/634 |
| 2014/0359201 A1* | 12/2014 | Chakrabarti ........ | G06F 12/0253 711/103 |
| 2015/0234869 A1 | 5/2015 | Chan et al. | |
| 2015/0234896 A1 | 8/2015 | Dageville et al. | |
| 2015/0256476 A1 | 9/2015 | Kurtzman et al. | |
| 2016/0041848 A1 | 2/2016 | Li et al. | |
| 2016/0055043 A1* | 2/2016 | Chikabelapur ....... | G06F 11/073 714/37 |
| 2016/0085656 A1 | 3/2016 | Braun et al. | |
| 2016/0321130 A1* | 11/2016 | Takamiya ............ | G06F 11/073 |
| 2016/0357572 A1* | 12/2016 | Myrick ................ | G06F 9/5016 |
| 2017/0024899 A1 | 1/2017 | Hammoud et al. | |
| 2019/0332272 A1 | 10/2019 | Mangione-Tran | |

OTHER PUBLICATIONS

Pynatrace, "Analyzing Java Memory", Chapter: Memory Management, Analyzing the Performance Impact of Memory Utilization and Garbage Collection—Java Enterprise Performance—Dynatrace, Date Unknown, downloaded Oct. 18, 2016, https://www.dynatrace.com/resources/ebooks/javabook/analyzing-java-memory/, 22 pp.

Sor, Vladimir et al.; "Automated Statistical Approach for Memory Leak Detection; Case Studies", R Meersman et al. (Ed.): OTM 2011, Part 11, LNCS 7045, pp. 633-640, 2011, 8 pp.

Sor, Vladimir et al.; "A Statistical Approach for Identifying Memory Leaks in Cloud Applications", CLOSER 2011—International Conference on Cloud Computing and Services Science, pp. 523-628, Date Unknown, 6 pp.

Anhoi, Jacob et al.; "Run Charts Revisited: A Simulation Study of Run Chart Rules for Detection of Non-Random Variation in Heal Th Care Processes", PLoS One, a Peer-Reviewed, Open Access Journal, Published online Nov. 24, 2014, doi: 10.1371/joumaLpone.0113825, https://www.ncbi.nlm.nih.pov/pmc/articles/PMC4244133/, 8 pp.

Mitchell, Neil, "Leaking Space", Eliminating Memory Hogs, ACM Queue, Quality Assurance, Oct. 23, 2013, vol. 11, Issue 9, downloaded Oct. 18, 2016, https://queue.acm.org/detail.cfm?id=2538488, 22 pp.

\* cited by examiner

DETECTION AND REMEDIATION OF MEMORY LEAKS

CROSS REFERENCE TO RELATED APPLICATION(S)

This is a continuation of U.S. application Ser. No. 16/406,941, filed May 8, 2019; which is a continuation of U.S. application Ser. No. 15/334,382, filed Oct. 26, 2016, which claims the benefit of U.S. Provisional Application No. 62/327,540, filed Apr. 26, 2016, entitled "Detection and Remediation of Memory Leaks," the disclosure of which is herein incorporated by reference in its entirety for all purposes.

TECHNICAL FIELD

This disclosure relates in general to the detection and remediation of memory leaks in an electronic computing and communications system.

BACKGROUND

An electronic computing and communications system can include one or more communicating and computing elements, which can, in the course of communicating and computing, process information using servers at a datacenter. The servers can instantiate software services deliverable by the electronic computing and communications system and utilize system resources, such as memory, to process information associated with the instantiated software services. Mechanisms can be included within the datacenter to monitor the amount of memory used by the servers.

SUMMARY

Disclosed herein are implementations of systems and techniques for the detection and remediation of memory leaks.

In an implementation, a system is provided for detecting and remediating memory leaks associated with an application environment. The system comprises a memory and a processor. The memory is configured to store data and one or more processor-executable routines. The processor is configured to communicate with the memory and to execute the routines stored therein. The routines, when executed, cause the system to monitor allocations of memory from a managed memory space to respective operations to produce memory allocation data, wherein the managed memory space is provisioned to the application environment. The routines, when executed, further cause the system to monitor deallocations of memory to at least some of the respective operations to produce memory deallocation data. The routines, when executed, further cause the system to determine that samples of memory allocation data and memory deallocation data observed over a time interval indicate a trend in memory leakage or a trend change in memory leakage. The routines, when executed, further cause the system to determine a projection of future memory usage by operations associated with the trend using binned sets of the memory allocation data and the memory deallocation data. The routines, when executed, further cause the system to determine a predicted time at which memory usage by the operations associated with the trend is expected to exceed a threshold using the projection of future memory usage. The routines, when executed, further cause the system to perform a remediation action before the predicted time.

In an implementation, a method is provided for detecting and remediating memory leaks associated with an application environment. The method comprises monitoring allocations of memory from a managed memory space to respective operations to produce memory allocation data, wherein the managed memory space is provisioned to the application environment. The method further comprises monitoring deallocations of memory to at least some of the respective operations to produce memory deallocation data. The method further comprises determining that samples of memory allocation data and memory deallocation data observed over a time interval indicate a trend in memory leakage or a trend change in memory leakage. The method further comprises determining a projection of future memory usage by operations associated with the trend using binned sets of the memory allocation data and the memory deallocation data. The method further comprises determining a predicted time at which memory usage by the operations associated with the trend is expected to exceed a threshold using the projection of future memory usage. The method further comprises performing a remediation action before the predicted time.

In an implementation, a system is provided, comprising an application environment and a memory monitor module. The application environment is configured to automatically allocate unallocated memory from a managed memory space to operations executed in the application environment and periodically deallocate unused allocated memory. The memory monitor module is configured to determine that sampled observation points of memory allocation data and memory deallocation data observed over a time interval indicate a trend in memory leakage or a trend change in memory leakage. The memory monitor module is further configured to determine a predicted time at which a total memory usage of the application environment is expected to exceed a threshold using a projection of future memory usage by operations associated with the trend, the projection of future memory usage determined using binned sets of the sampled observation points. The memory monitor module is further configured to perform a remediation action before the predicted time to prevent a memory constraint from occurring within the application environment.

These and other aspects of this disclosure are disclosed in the following detailed description, the appended claims, and the accompanying figures.

BRIEF DESCRIPTION OF THE DRAWINGS

The description herein makes reference to the accompanying drawings wherein like reference numerals refer to like parts throughout the several views.

DETAILED DESCRIPTION

Figure 1:
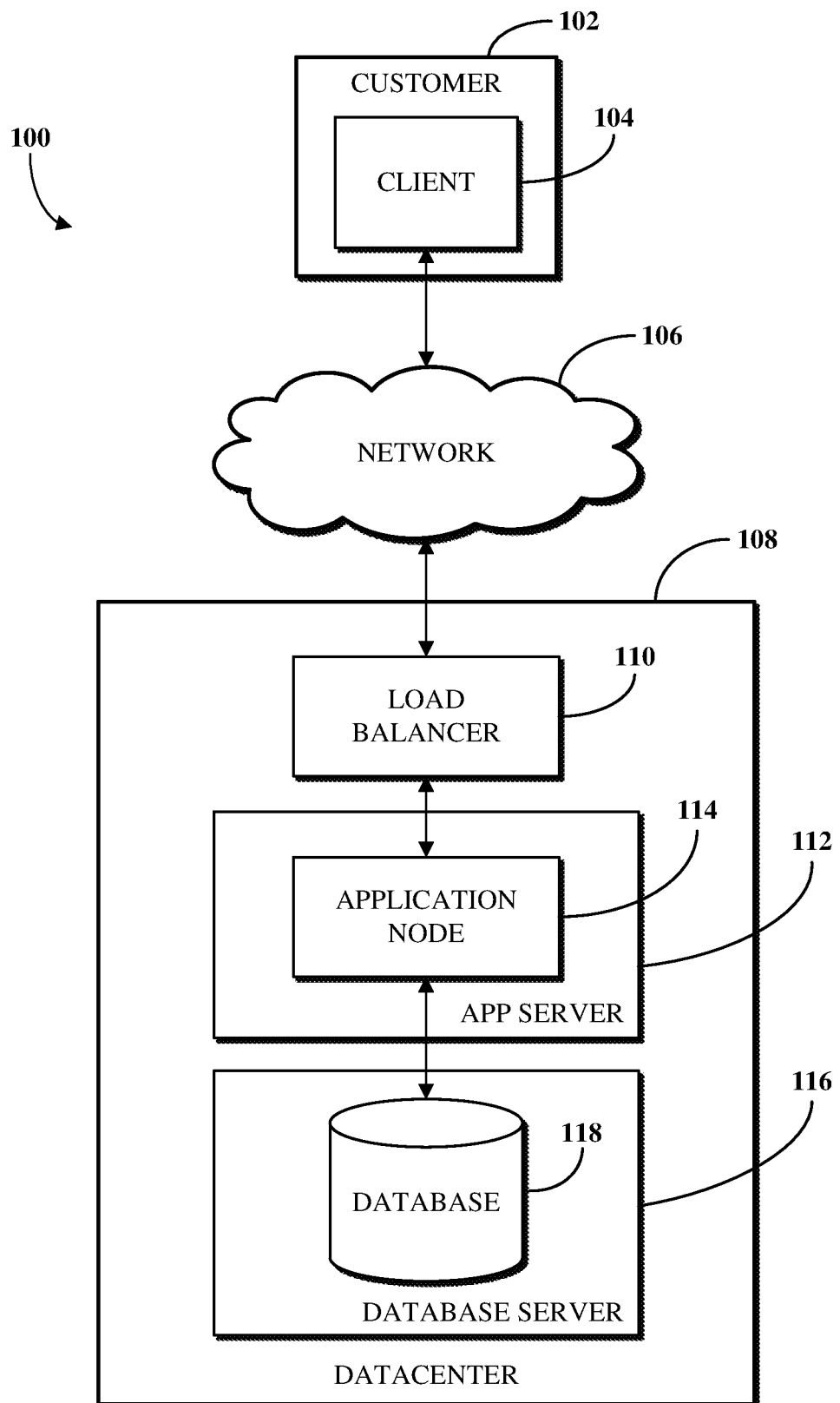
FIG. 1 is a diagram of an example of an electronic computing and communications system.

Customers of a platform-as-a-service (PaaS) cloud computing provider can customize platform software to deliver application software based on their particular service and business management needs. For example, a customer can customize the platform software by adding or modifying scripts for executing routines related to services deliverable by the customer, but which are not native to the platform software. Because these customizations consume the system resources of an application server executing the customized platform software, it is important to monitor resource consumption to make sure that resources no longer in use are recovered for executing further operations on the application server. Many application servers, such as Java Virtual Machines, include native processes for recovering consumed memory. For example, a Java Virtual Machine can include a garbage collector aspect for recovering consumed memory that is no longer being used to execute software.

An application server can continue executing processes associated with the platform software while system memory remains available. Once enough memory is consumed, the application server can trigger a native process to recover memory. However, the native process might not be able to recover enough memory to further execute the customized platform software on the application server. Consumed memory remaining unrecovered after a recovery attempt can be referred to as a memory leak. If the memory leak is not timely remediated, though, the application server can experience systematic issues, such as memory constraints, preventing it from being able to execute further processes associated with the platform software, for example, due to performance issues caused by limited memory available or wholly unavailable memory.

Furthermore, in that the application server can execute many types of operations, whether native or customized with respect to the platform software, different types of memory leaks can occur within the application server. For example, a single runaway operation executing on an application server can on its own consume enough system memory to cause a memory constraint for the application server within minutes or hours. In another example, a collection of operations can execute on an application server for days or weeks before a memory constraint might occur. These different types of memory leaks can pose different challenges to the continued operation of an application server and may also pose different challenges in their detection and the type and timing of remediation that is needed. Therefore, it is desirable to implement a sophisticated mechanism for detecting different types of memory leaks that can occur within an application server and conforming corresponding remediation to the particular types of detected memory leaks.

In an implementation, memory leaks within an application environment including an application server can be detected and remediated. Memory allocation data indicating memory use by operations executed within the application environment, and memory deallocation data received from garbage collection operations indicating deallocations of at least some of those operations, can be used to detect a memory leak. For example, memory remaining allocated after the operation to which the memory was allocated has been terminated can be identified as a memory leak within the application environment. The memory leak can be characterized as a developing memory leak or an in-progress memory leak based on a total amount of memory of the application environment in use and a time at which the application environment is expected to experience a memory constraint based on the memory leak. Developing memory leaks are those that will occur at some later time and can be remediated by identifying trends in the garbage collection data indicating rates of memory use over time and terminating operations executing throughout the trend. In-progress memory leaks are those that will occur at a very near time and can be remediated by terminating oldest operations or operations consuming largest portions of memory. In some implementations, where initial remediation efforts are not effective to remediate the identified memory leak, the memory leak can be remediated by terminating further operations or resetting the application environment.

As used herein, the term "operation" can refer to one or more processes performable in connection with an application executing on a server. In some implementations, an operation can include one or more transactions, scripts, and/or database queries. A "transaction" is a request from a client interacting with a server, for example, a request to load a web page or open a web application. A "script" is a server-side instruction (or set of instructions) written in JavaScript, PHP, Perl, or another language, which, for example, can be run responsive to the execution of a transaction. A "database statement" is a command for requesting information from, putting information into, or removing information from a subject database, which, for example, can be generated responsive to the execution of a script. The term "operation" can further refer to other processes, including, without limitation, web service calls executing Java code, running compiled executables, or the like.

The systems and techniques of this disclosure address problems particular to computer networks used for delivering software services at a datacenter, for example, those concerning the use and availability of resources of a device or machine for delivering the software services. These computing network-specific issues can be solved by implementations of this disclosure. For example, the use and availability of resources allocated to an application environment can be monitored in order to predict developing memory leaks and remediate causes before the memory leaks cause memory constraints within the application environment. The monitoring can further react to in-progress memory leaks by taking prompt action to free resources of the application server to prevent otherwise immediate memory constraints. The implementations of this disclosure thus introduce new and efficient improvements in the ways in which memory usage within a device or machine can be detected and remediated.

To describe some implementations in greater detail, reference is first made to examples of hardware structures. FIG. 1 is a diagram of an example of an electronic computing and communications system 100 in accordance with this disclosure. As used herein, the term 'electronic computing and communications system,' or variations thereof, can be, or include, a distributed computing system, such as a client-server computing system, a cloud computing system, a clustered computing system, or the like.

The system 100 can include one or more customers 102. The customer 102 can include one or more clients. For example, and without limitation, the customer 102 can include a client 104. The client 104 can comprise a computing system, which can include one or more computing devices, such as a mobile phone, a tablet computer, a laptop computer, a notebook computer, a desktop computer, or other suitable computing device, or combination of computing devices. In some implementations, the client 104 can be implemented as a single physical unit, or a combination of physical units. In some implementations, a single physical unit can include multiple clients.

In some implementations, the client 104 can be an instance of an application running on a customer device associated with the customer 102. As used herein, the term 'application' can include, but is not limited to, applications, programs, instances, processes, threads, services, plugins, patches, application version upgrades, and/or other identifiable computational. The system 100 can include a number of customers and/or clients and/or can have a different configuration of customers and/or clients than generally illustrated in FIG. 1. For example, and without limitation, the system 100 can include hundreds or thousands of customers and a customer can include and/or be associated with a number of clients. A customer can include a customer network and/or domain. For example, and without limitation, the client 104 can be associated and/or communicate with a customer network and/or domain.

The system 100 can include a datacenter 108. The datacenter 108 can include one or more servers. For example, and without limitation, the datacenter 108, as generally illustrated, includes an application server 112 and a database server 116. A datacenter, such as datacenter 108, can represent a geographic location, which can include a facility, where the one or more servers are located. The system 100 can include a number of datacenters and servers and/or can include a different configuration of datacenters and servers than generally illustrated in FIG. 1. For example, and without limitation, the system 100 can include tens of datacenters and a datacenter can include hundreds or a suitable number of servers. In some implementations, the datacenter 108 can be associated and/or communicate with one or more datacenter networks and/or domains, which can include domains other than the client domain.

In some implementations, the client 104 and the servers associated with the datacenter 108 are configured to connect to, or communicate via, a network 106. In some implementations, a client 104 associated with the customer 102 can connect to the network 106 via a communal connection point, link, and/or path. In some implementations, a client 104 associated with the customer 102 can connect to, or communicate via, the network 106 using a distinct connection point, link, and/or path. A connection point, link, or path can be wired, wireless, use other communication technologies, or a combination thereof.

In some implementations, the network 106 can include, for example, the Internet. In some implementations, the network 106 can be, or include, a local area network (LAN), a wide area network (WAN), a virtual private network (VPN), or other public or private means of electronic computer communication capable of transferring data between a client, such as the client 104, and one or more servers associated with the datacenter 108, and/or a combination thereof. The network 106, the datacenter 108, or another element, or combination of elements, of the system 100 can include network hardware such as routers, switches, load balancers, other network devices, or combinations thereof. For example, datacenter 108 can include a load balancer 110 for routing traffic from network 106 to various servers associated with the datacenter 108.

The load balancer 110 can route, or direct, computing communication traffic, such as signals and/or messages, to respective elements of the datacenter 108. For example, the load balancer 110 can operate as a proxy, or reverse proxy, for a service, such as an Internet-delivered service, provided by the datacenter 108 to one or more remote clients, such as the client 104, via the network 106. Routing functions of the load balancer 110 can be configured directly or via a Domain Name System (DNS). The load balancer 110 can coordinate requests from remote clients, such as the client 104, and can simplify client access by masking the internal configuration of the datacenter 108 from the remote clients. Request coordination can include maintaining information for sessions, such as sticky sessions, between a client and a service or application provided by the datacenter 108.

In some implementations, maintaining information for a sticky session can include maintaining information to forward requests associated with a session from a client to an identified element of the datacenter 108 for the session. A load balancer 110 can operate as a firewall, allowing or preventing communications based on configuration settings. Although the load balancer 110 is depicted in FIG. 1 as being within the datacenter 108, in some implementations, the load balancer 110 can instead be located outside of the datacenter 108, for example, when providing global routing for multiple datacenters. In some implementations, load balancers can be included both within and outside of the datacenter 108.

In some implementations, the datacenter 108 includes an application server 112 and a database server 116. The application server 112 and/or the database server 116 can be a computing system, which can include one or more computing devices, such as a desktop computer, a server computer, or other computer capable of operating as a server. In some implementations, the application server 112 and/or the database server 116 can be non-hardware servers implemented on a physical device, such as a hardware server. In some implementations, the application server 112 and the database server 116 can be implemented as a single hardware server or as a single non-hardware server implemented on a single hardware server. In some implementations, a number of applications servers or database servers can be implemented at the datacenter 108. In some implementations, the datacenter 108 can include servers other than or in addition to the application server 112 or the database server 116, for example, a web server.

In some implementations, the application server 112 includes an application node 114, which can be a process executed on the application server 112. For example, and without limitation, the application node 114 can be executed in order to deliver services to a client, such as the client 104, as part of a web application. The application node 114 can be implemented using processing threads, virtual machine instantiations, or other computing features of the application server 112. In some implementations, the application node 114 can store, evaluate, or retrieve information from a database, such as the database 118 of the database server 116.

In some implementations, the application server 112 can include a suitable number of application nodes depending upon a system load and/or other characteristics associated with the application server 112. For example, and without limitation, the application server 112 can include two or more nodes forming a node cluster. In some implementations, the application nodes implemented on a single application server 112 can run on different hardware servers. In some implementations, the application server 112 can include execute instructions to perform garbage collection for available system resources or to utilize the results of such garbage collection operations to monitor and remediate memory leak events, as discussed herein.

The database server 116 can be configured to store, manage, or otherwise provide data for delivering services to the client 104 over a network. In some implementations, the database server 116 includes a data storage unit, such as a database 118, which can be accessed by an application executed on the application server 112. In some implementations, the database 118 can be implemented as a relational database management system (RDBMS), an object database, an XML database, a configuration management database (CMDB), a management information base (MIB), one or more flat files, or the like or a combination thereof. By way of non-limiting example, the system 100, in some implementations, can include an XML database and a CMDB. While limited examples are described, the database 118 can be configured as and/or comprise a suitable database type. Further, the system 100 can include one, two, three, or a suitable number of databases configured as and/or comprising a suitable database type and/or combination thereof.

Some or all of the systems and techniques described herein can operate and/or be executed on or by the servers associated with the system 100. For example, garbage collection routines or analytics which process and utilize the results of such garbage collection operations may be implemented on one or more applications servers 112 or on other components of the system 100. In some implementations, the systems and techniques described herein, portions thereof, or combinations thereof, can be implemented on a single device, such as a single server, or a combination of devices, for example, a combination of the client 104, the application server 112, and the database server 116. In some implementations, one or more databases (e.g., the database 118), tables, other suitable information sources, and/or portions or combinations thereof, can be stored, managed, or otherwise provided by one or more of the elements of the system 100 other than the database server 116, such as the client 104 and/or the application server 112.

In some implementations, the system 100 can include devices other than the client 104, the load balancer 110, the application server 114, and the database server 116 as generally illustrated in FIG. 1. In some implementations, one or more additional servers can operate as an electronic computing and communications system infrastructure control, from which servers, clients, and/or both, can be monitored, controlled, configured, or a combination thereof.

In some implementations, the network 106, one or more datacenters, such as the datacenter 108, and one or more load balancers, such as the load balancer 110, can be implemented within a distributed computing system. In some implementations, a load balancer associated with a distributed computing system (e.g., the load balancer 110) can communicate with the network 106, one or more datacenters (e.g., the datacenter 108), other load balancers, or a combination thereof. In some implementations, the load balancer 110 can be configured to route communications to a primary datacenter, identify a failover condition (i.e., such as an enumerated failover condition) at the primary datacenter, and redirect communications to a secondary datacenter until the failover condition is resolved. Although illustrated as a single unit in FIG. 1, a load balancer 110 can be implemented as multiple physical or logical units. For example, a distributed computing system can include distinct routing units, load balancing units, firewall units, or the like.

The primary datacenter can include a primary database, such as the database 118, and the secondary datacenter can include a secondary database. In some implementations, the secondary database can include an exact or substantially exact mirror, copy, or replication of the primary database. In some implementations, the primary database and/or the secondary database can be implemented as an RDBMS, an object database, an XML database, one or more flat files, or the like.

An application node implemented within a distributed computing environment can connect to and/or communicate with the primary database, which can be associated with the datacenter with which the application node is associated, and/or associated with another datacenter. For example, a primary datacenter can include a primary database, and a first set of application nodes. A secondary datacenter can include a secondary database and a second set of application nodes. The application nodes of the first and second sets can provide a service or application to remote clients, and can read and/or write data in the primary database. The secondary database can mirror changes made to the primary database and prevent write operations performed directly on the secondary database. In the event a failover condition associated with the primary database is identified, the secondary database can operate as the primary database and can allow read and/or write access to data. The primary database can then operate as the secondary database, mirror the new primary database, and prevent direct write access to the new secondary database.

In some implementations, a distributed computing system can allocate resources of a computer network using a multi-tenant or single-tenant architecture. Allocation resources in a multi-tenant architecture can include installations and/or instantiations of one or more servers, such as application servers, database servers, and/or other servers, or combination of servers, that can be shared amongst multiple customers. For example, a web server, such as a unitary Apache installation, an application server, such as a unitary Java Virtual Machine, a single database server catalog, such as a unitary MySQL catalog, can handle requests from multiple customers. In some implementations of a multi-tenant architecture, the application server, the database server, and/or both can distinguish between and segregate data and/or other information of the various customers using the system.

In a single-tenant infrastructure (which can also be referred to as a multi-instance architecture), separate web servers, application servers, database servers, and/or combinations thereof, can be provisioned for at least some customers, and/or customer sub-units. In some implementations, customers and/or customer sub-units can access one or more dedicated web servers, have transactions processed using one or more dedicated application servers, and/or have data stored in one or more dedicated database servers, catalogs, and/or both. Physical hardware servers can be shared such that multiple installations and/or instantiations of web servers, application servers, database servers, and/or combinations thereof, can be installed on the same physical server. An installation can be allocated a portion of the physical server resources, such as RAM, storage, communications bandwidth, and/or processor cycles.

In some implementations, a customer instance can include multiple web server instances, multiple application server instances, multiple database server instances, and/or a combination thereof. The server instances can be physically located on different physical servers and can share resources of the different physical servers with other server instances associated with other customer instances. In a distributed computing system, multiple customer instances can be used concurrently. Other configurations and/or implementations of customer instances can also be used. The use of customer instances in a single-tenant architecture can provide, for example, true data isolation from other customer instances, advanced high availability to permit continued access to customer instances in the event of a failure, flexible upgrade schedules, an increased ability to customize the customer instance, and/or a combination thereof.

Figure 2:
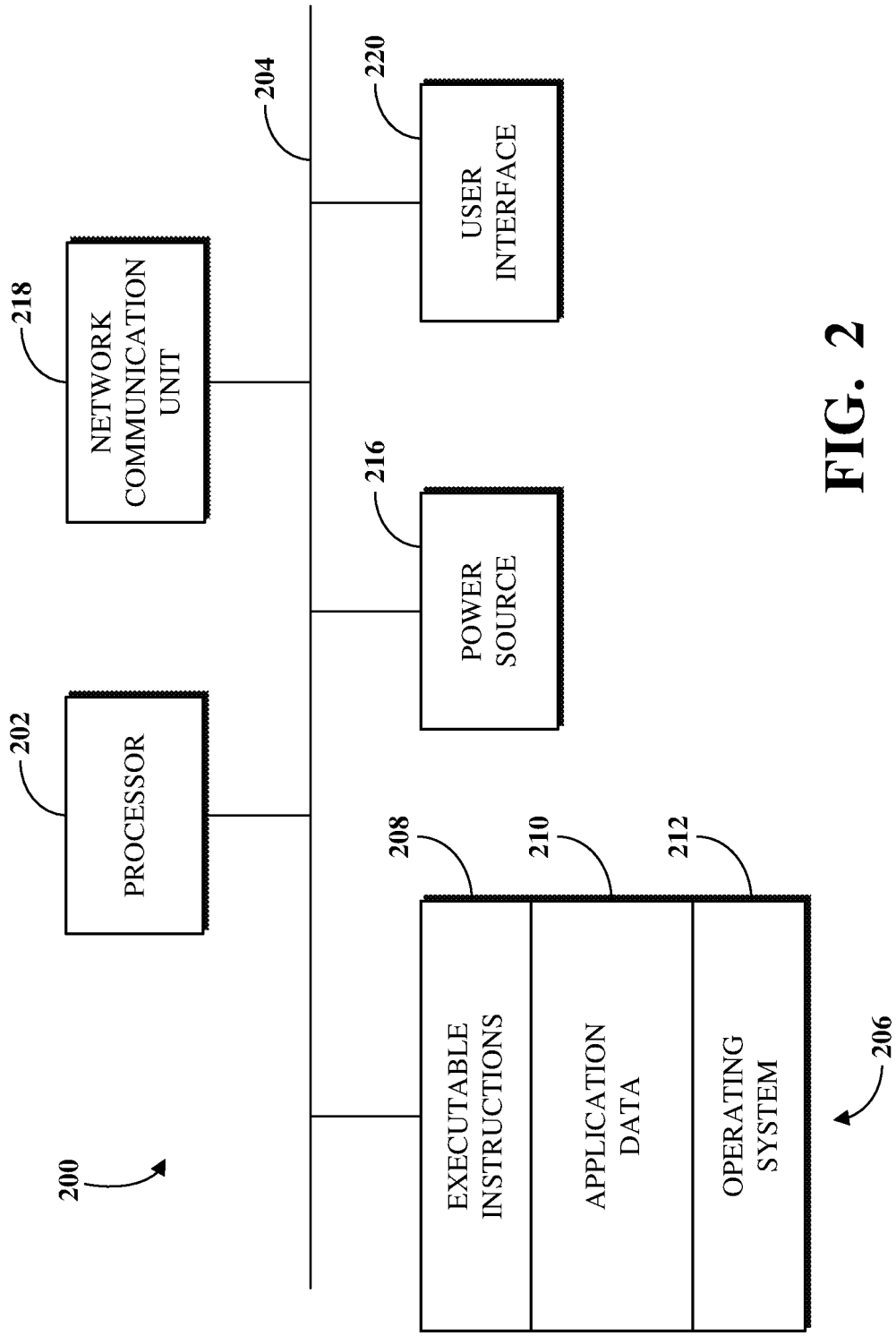
FIG. 2 is a block diagram of an example internal configuration of a computing device of an electronic computing and communications system.

FIG. 2 generally illustrates a block diagram of an example internal configuration of a computing device 200, such as a client 104 and/or a server, such as an application server 112 and/or a database server 116, of the system 100 as generally illustrated in FIG. 1. As previously described, a client and/or server can be a computing system including multiple computing devices and/or a single computing device, such as a mobile phone, a tablet computer, a laptop computer, a notebook computer, a desktop computer, a server computer, and/or other suitable computing devices.

A computing device 200 can include components and/or units, such as a processor 202, a bus 204, a memory 206, a network communication unit 218, a power source 216, a user interface 220, other suitable components and/or a combination thereof.

The processor 202 can be a central processing unit (CPU), such as a microprocessor, and can include single or multiple processors having single or multiple processing cores. Alternatively, the processor 202 can include another type of device, or multiple devices, capable of manipulating or processing information now-existing or hereafter developed. For example, the processor 202 can include multiple processors interconnected in a hardwired and/or networked manner, including by wireless networking. In some implementations, the operations of the processor 202 can be distributed across multiple physical devices and/or units that can be coupled directly or across a local area or other network. In some implementations, the processor 202 can include a cache, or cache memory, for local storage of operating data and/or instructions.

In some implementations, the memory 206 can include volatile memory, non-volatile memory, and/or a combination thereof. For example, the memory 206 can include volatile memory, such as one or more DRAM modules such as DDR SDRAM, and non-volatile memory, such as a disk drive, a solid state drive, flash memory, Phase-Change Memory (PCM), and/or a form of non-volatile memory capable of persistent electronic information storage, such as in the absence of an active power supply. In some implementations, the memory 206 can include another type of device, or multiple devices, capable of storing data and/or instructions for processing by the processor 202, now-existing or hereafter developed. The processor 202 can access and/or manipulate data in the memory 206 via the bus 204. Although depicted here as a single bus, the bus 204 can be composed of multiple buses, that can be connected to one other through various bridges, controllers, and, or adapters.

Although shown as a single block in FIG. 2, the memory 206 can be implemented as multiple units. For example, a computing device 200 can include volatile memory, such as RAM, and persistent memory, such as a hard drive or other storage. The memory 206 can be distributed across multiple machines such as network-based memory or memory in multiple machines performing the operations of clients and/or servers.

The memory 206 can include executable instructions 208, data, such as application data 210, an operating system 212, or a combination thereof, for immediate access by the processor 202. The executable instructions 208 can include, for example, one or more application programs, which can be loaded and/or copied, in whole or in part, from non-volatile memory to volatile memory to be executed by the processor 202. The executable instructions 208 can be organized into programmable modules and/or algorithms, functional programs, codes, code segments, and/or combinations thereof, to perform various functions described herein. For example, the executable instructions 208 can include instructions to implement all or part of a garbage collection routine for recovering previously allocated memory as well as routines for (based on the operation of results of such garbage collection routines) identifying memory leaks of different types and addressing the presence of such leaks based on the type of leak so identified. The application data 210 can include, for example, user files, database catalogs and/or dictionaries, configuration information or functional programs, such as a web browser, a web server, a database server, and/or a combination thereof. The operating system 212 can be, for example, Microsoft Windows®, Mac OS X®, Linux®; an operating system for a small device, such as a smart phone or tablet device; or an operating system for a large device, such as a mainframe computer. The memory 206 can comprise one or more devices and can utilize one or more types of storage, such as solid state or magnetic storage.

The network communication unit 218 can also be coupled to the processor 202 via the bus 204. In some implementations, network communication unit 218 can comprise one or more transceivers. The network communication unit 218 can, for example, provide a connection or link to a network, such as the network 106, via a network interface, which can be a wired network interface, such as Ethernet, or a wireless network interface. For example, the computing device 200 can communicate with other devices via the network communication unit 218 and the network interface using one or more network protocols, such as Ethernet, TCP, IP, power line communication (PLC), WiFi, infrared, GPRS, GSM, CDMA, or other suitable protocols.

A user interface 220 can include a display, a positional input device, such as a mouse, touchpad, touchscreen, or the like, a keyboard, and/or other human and machine interface devices. The user interface 220 can be coupled to the processor 202 via the bus 204. Other interface devices that permit a user to program or otherwise use the computing device 200 can be provided in addition to or as an alternative to a display. In some implementations, the user interface 220 can include a display, which can be a liquid crystal display (LCD), a cathode-ray tube (CRT), a light emitting diode (LED) display, such as an OLED display, or other suitable display.

Figure 3:
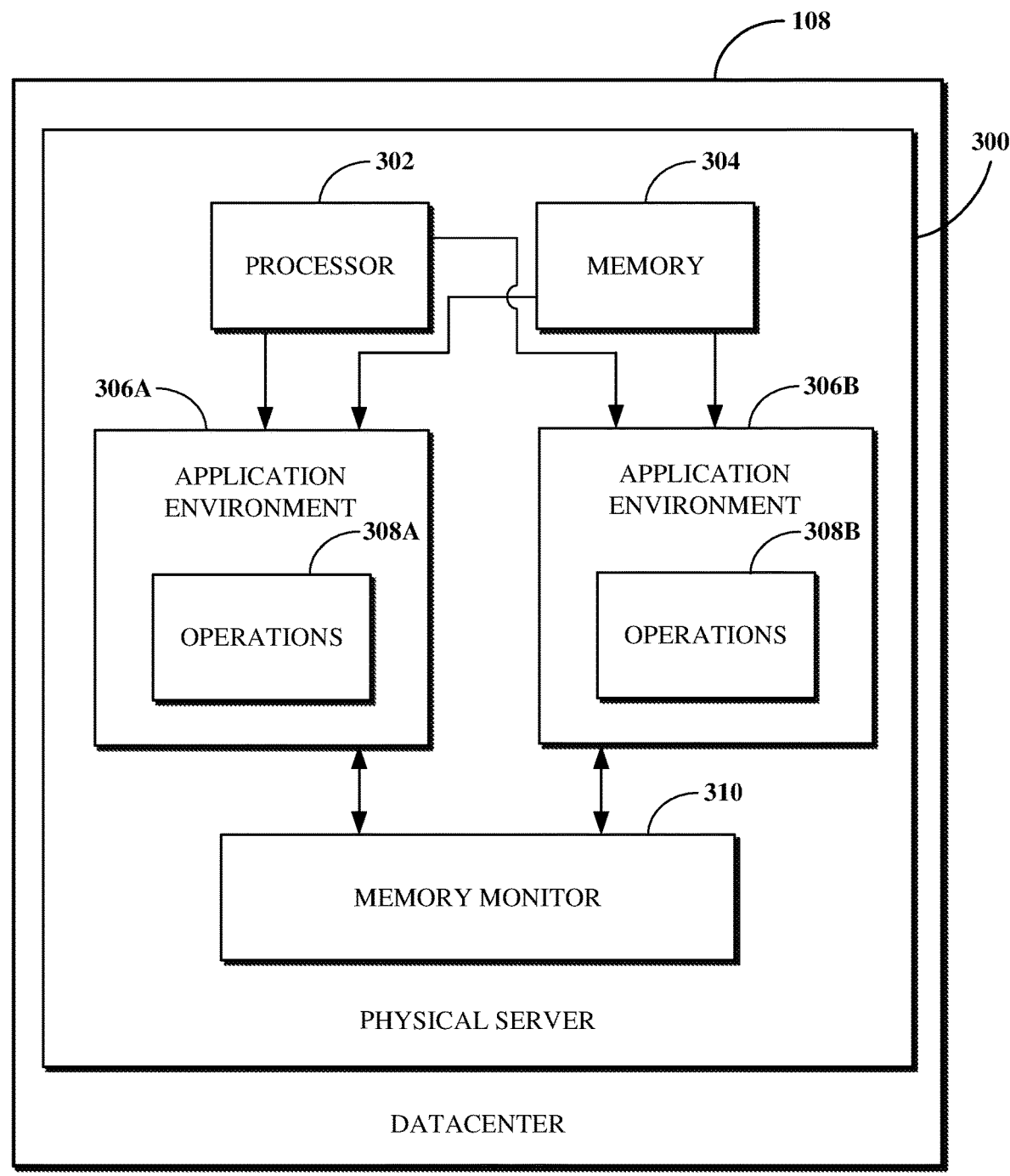
FIG. 3 is a block diagram of an example of application environments operating within a datacenter of an electronic computing and communications system.

FIG. 3 is a block diagram of an example of application environments operating within a datacenter of an electronic computing and communications system, such as the system 100. A physical server 300 located within a datacenter, such as the datacenter 108 of the system 100, can be a computing device, such as the computing device 200. The physical server 300 can include a processor 302 and a memory 304, and allotments of the processor 302 and memory 304 can be provisioned to various application environments 306A, 306B operating on the physical server 300. In some implementations, memory can be allotted to a managed memory space. The managed memory space can be provisioned to an application environment 306A, 306B. For example, memory can be allocated from the managed memory space to execute operations (e.g., the operations 308A, 308B, described later) in the application environment 306A, 306B.

An application environment 306A, 306B can include servers or other resources for executing software. In some implementations, an application environment 306A, 306B can include an application server, such as the application server 112 of the system 100. For example, the application server can be a Java Virtual Machine executing on the physical server 300. In some implementations, the application server can use resources of the physical server 300 allocated to its application environment to execute respective software, such as platform software or application software developed by a customer of a PaaS service provider using platform software. For example, there can be a number of application environments operating on a physical server 300, and those application environments can have allotments of processor cycles of the processor 302 or memory of the memory 304. For example, an allotment to an application server of the application environment 306A can include M processor cycles and N gigabytes of memory, and an allotment to an application server of the application environment 306A can include X processor cycles and Y gigabytes of memory. M and X can be the same or a different number, and N and Y can be the same or a different number. The allotments can be used by an application server 112 operating in an application environment to execute software within the application environment.

There can be operations associated with an application environment, such as the operations 308A of the application environment 306A and the operations 308B of the application environment 306B. In some implementations, the operations can be native operations associated with the application server or the software executing on the application software. For example, operations can include database queries used by platform software to retrieve data from a database for implementing functionality of the platform software. In some implementations, the operations can be configured or otherwise customized by a customer associated with the application environment. For example, operations can include scripts written by a customer, such as the customer 102 of the system 100, for delivering software services in connection with the particular platform software instance associated with the customer 102. An operation can execute on an application node, such as the application node 114 of the system 100, which can be instantiated by the application server of the respective application environment.

The physical server 300 can include a memory monitor module 310, which can monitor how the allotments of memory to the application environments 306A, 306B are used. For example, the memory monitor module 310 can include processor-executable instructions for monitoring how portions of memory allotments are allocated for executing software and operations associated with the software within an application environment 306A, 306B. In another example, the memory monitor module 310 can include processor-executable instructions for monitoring how allocated portions of the memory allotments are deallocated or otherwise recovered after the software or respective operations have completed executing. In some implementations, the physical server 300 can include or execute multiple memory monitor modules 310, for example, one per application environment. In some implementations, a memory monitor module 310 can be executed within an application environment 306A, 306B instead of as instructions separate from the application environment 306A, 306B on the physical server 300.

Implementations of the system depicted in FIG. 3 can include additional components or modules, fewer components or modules, combined components or modules, have components or modules with additional or less functionality than described above, and/or combinations thereof. For example, an application environment 306A, 306B can include a database server, such as the database server 116 of the system 100, for operating a database in connection with the software of the application environment 306A, 306B. In some implementations, a database server 116 can be operated on the same physical server 300 on which the application server executing the software is operated. In some implementations, the database server 116 can be operated on a different physical server than the physical server 300 operating the application server executing the software.

Figure 4:
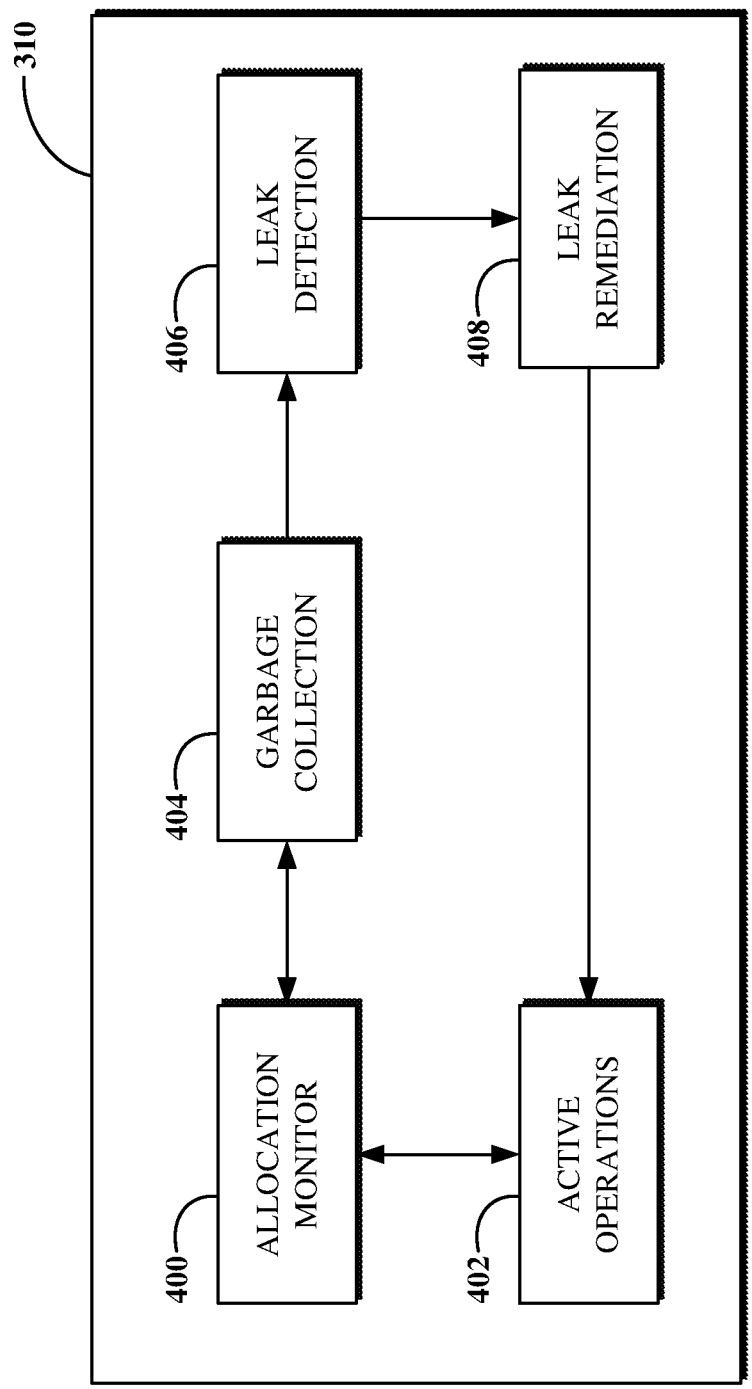
FIG. 4 is a block diagram of an example of modules of a memory monitor configured to detect and remediate memory leaks associated with an application environment.

FIG. 4 is a block diagram of an example of modules of a memory monitor, such as the memory monitor module 310, configured to detect and remediate memory leaks associated with an application environment. As stated above, the memory allotments provisioned to an application environment by a server can be consumed via execution of software or operations associated with the application environment. As such, the memory monitor module 310 can include modules to monitor the use of allocated memory allotments and prevent memory constraints from preventing an application server of the application environment from executing further operations. In some implementations, the memory monitor module 310 can include an allocation monitor module 400, an active operations module 402, a garbage collection module 404, a leak detection module 406, and a leak remediation module 408.

The allocation monitor module 400 can monitor allocations of memory to operations executing within an application environment and deallocations of the allocated memory. In some implementations, the active operations module 402 can include a list of operations using memory of the application environment based on the visibility the memory monitor module 310 has into the application environment. For example, the active operations module 402 can access a cache in an application server of the application environment, wherein the cache stores data indicative of the active operations using memory allotted to the application server. In another example, the active operations module 402 can access a database table of a database server associated with the application server, wherein the database table stores the data indicative of the active operations. The allocation monitor module 400 can identify the portion of the memory allotment for the application environment that is consumed by the operations identified by the active operations module 402.

Separately, the garbage collection module 404 can have visibility into software executable within the application environment to recover memory usage consumed by terminated operations. In some implementations, an application server of an application environment can include garbage collection software for recovering memory previously consumed, but no longer used, to execute operations within the application environment. In some implementations, the application server can execute the garbage collection software on a periodic basis, for example, once every one to five minutes while the application server operates on a physical server. In some implementations, the application server can execute the garbage collection software responsive to a determination that an available amount of the allotted memory available for executing processes on the application server has dropped below a minimum memory threshold. For example, the application server can trigger execution of the garbage collection software responsive to a determination that some threshold minimum (e.g., 33%, 25%, 20%, 15%, and so forth) of total memory allotment is available at a given time.

The garbage collection module 404 can have visibility into the garbage collection software executed by the application server, or at least results of a garbage collection operation performed by the garbage collection software. As such, the garbage collection module 404 can determine whether an amount of memory recovered by a garbage collection operation, along with an amount of unallocated memory of the application environment, is large enough for an application server of the application environment to continue executing software or operations.

In some implementations, where the garbage collection module 404 determines that the total available memory for the application server is equal to or greater than an average amount of memory used by it over a recent period of time, for example, the last hour, the memory monitor module 310 can terminate a current operation. For example, the allocation monitor module 400 can recommence monitoring operations of the application environment (e.g., via the active operations module 402), or the garbage collection module 404 can wait for the performance of a next garbage collection operation.

In some implementations, where the garbage collection module 404 determines that the total available memory for the application server is less than an average amount of memory used by it over a recent period of time (e.g., because one or more garbage collection operations did not free up enough consumed memory), a leak detection module 406 can be executed. The leak detection module 406 includes instructions for detecting memory leaks present within the application environment, namely, within an application server of the application environment. In some implementation, data derived from the garbage collection module 404 can be used by the leak detection module 406. For example, data output by different garbage collection operations identified by the garbage collection module 404 can indicate that a memory leak might occur at some point in the future, for example, based on data trends showing an increase in memory consumption without corresponding freeing of memory. In another example, data output by different garbage collection operations identified by the garbage collection module 404 can indicate that a memory leak is active in the application environment based on a pattern of high memory use without corresponding freeing of memory.

Responsive to the leak detection module 406 detecting a memory leak, data indicative of the detected memory leak can be used by a leak remediation module 408 to remediate the detected memory leak, for example, by freeing up memory associated with the detected memory leak. In some implementations, remediating a detected memory leak by the leak remediation module 408 can include terminating operations executing on the application server 112 until enough memory has been freed for further executing operations within the application environment. In some implementations, remediating a detected memory leak by the leak remediation module 408 can include restarting the application server of the application environment to completely free the memory allotted to it by the physical server on which the application environment operates.

As such, actions performed by the leak remediation module 408 can affect the active operations consuming resources of the application server. In some implementations, the list of active operations accessible by the active operations module 402 can be updated responsive to the leak remediation module 408 remediating a detected memory leak. For example, the leak remediation module 408 can hook into the active operations module 402 to trigger the active operations module 402 to obtain a current list of active operations responsive to the leak remediation module 408 completing a leak remediation operation.

Implementations of the memory monitor module 310 can include additional modules, fewer modules, combine modules, have modules with additional or less functionality than described above, and/or combinations thereof. For example, the memory monitor module 310 can include a termination module for terminating software or operations executing within the application environment. For example, in the event the leak detection module 406 repeatedly detects memory leaks associated with a specific application node executing on an application server of the application environment, the termination module can selectively terminate that application node. Alternatively, such termination functionality may be provided in one or more of the garbage collection module 404, leak detection module 406, or leak remediation module 408. In another example, the memory monitor module 310 can include a notification module for notifying users of the software executing on an application server when a memory leak is detected and/or remediated. For example, a notification generated by the notification module can indicate a previously terminated operation that caused a detected memory leak and an amount of memory released in response to the termination of the indicated operation. In yet another example, one or more of the allocation monitor module 400, the active operations module 402, the garbage collection module 404, the leak detection module 406, or the leak remediation module 408 can operate independent of a memory monitor module 310, for example, directly within an application environment.

Figure 5:
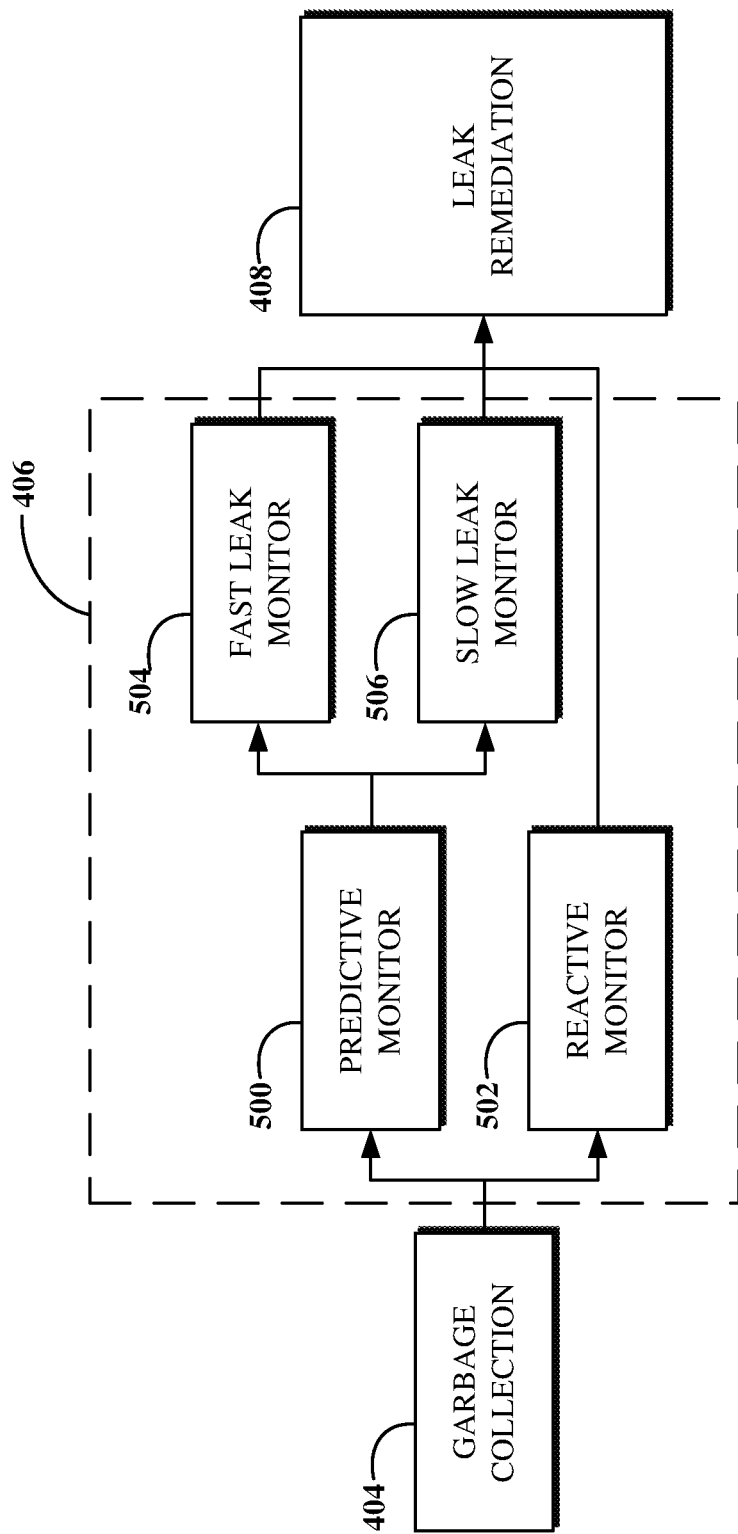
FIG. 5 is a block diagram of examples of predictive and reactive memory leak detection.

FIG. 5 is a block diagram of examples of predictive and reactive memory leak detection. In some implementations, the memory monitor module 310 can detect more than one type of memory leak (which can also be referred to as a "memory leakage"). For example, the leak detection module 406 of the memory monitor module 310 can analyze memory usage within an application environment (namely, by an application server of the application environment) to detect developing memory leaks, which are memory leaks forming within the application environment that, if not timely remediated, can cause a memory constraint for the application environment at a later time. In another example, the leak detection module 406 can analyze memory usage of the application environment to detect in-progress memory leaks, which are memory leaks already formed within the application environment that, if not promptly remediated, can result in immediate memory constraints for the application environment. As such, in some implementations, the leak detection module 406 of the memory monitor module 310 can include a predictive monitor module 500 including instructions for detecting developing memory leaks and a reactive monitor module 502 including instructions for detecting in-progress memory leaks.

The predictive monitor module 500 of the leak detection module 406 can include instructions for detecting a developing memory leak and triggering remediation before the memory leak increases in size to cause a memory constraint within the application environment. The predictive monitor module 500 can process developing memory leaks differently based on the predicted or estimated time from when the memory leak is detected to when the memory leak is expected to cause a memory constraint within the application environment. In some implementations, the predictive monitor module 500 can use instructions encoded as part of a fast leak monitor module 504 for detecting developing memory leaks that may cause a memory constraint within a relatively short timeframe, for example, seconds, minutes, or hours from initial detection. In some implementations, the predictive monitor module 500 can use instructions encoded as part of a slow leak monitor module 506 for detecting developing memory leaks that may cause a memory constraint over a relatively longer timeframe, for example, days, weeks, or months from initial detection.

The fast leak module 504 can analyze typical memory usage within the application environment to determine descriptive statistics for detecting a fast leak. In some implementations, the fast leak module 504 can determine trends based on statistical values (such as one or both of measures of central tendency (e.g., mean, median, mode, and so forth) or variation (e.g., variance. standard deviation, error terms, and so forth)) derived for typical memory usage such that detected memory usage values not falling within the statistically expected bounds of the trend line can be identified as memory usage values likely to be associated with a fast leak. In some implementations, repeat detection of high memory usage values can indicate that a fast leak is in-progress. For example, where memory usage values for a garbage collection operation identified by the garbage collection module 404 of the memory monitor module 310 indicate a memory usage that is three standard deviations above the mean memory usage for three previous, consecutive garbage collection operations, the fast leak module 504 can determine that a fast leak is developing and trigger remediation. Conversely, in some implementations, a hightail test may be employed to determine whether observed memory usage values are or are not associated with a fast leak.

In some implementations where the fast leak module 504 triggers remediation, the leak remediation module 408 may identify a list of operations executing within the application environment before the remediation was triggered. For example, where two operations, A and B, were both executed before the fast leak module 504 detected a memory leak to be remediated, A and B can be included in the list of operations identified by the leak remediation module 408. In another example, where A was executed before the fast leak module 504 detected a memory leak to be remediated and B was executed after the fast leak module 504 detected that memory leak, A, but not B, can be included in the list of operations identified by the leak remediation module 408. In some implementations, the list of operations executing within the application environment can be generated by an application server of the application environment executing a thread dump to identify individual operations executing on the application server.

An entry within the list of operations can represent an identified operation and include an identifier of the respective operation. For example, the identifier can be a unique character string identifying an operation within the application environment, a name of the operation, or some other information for uniquely identifying the operation. The list of operations can include further data associated with the operations. For example, entries within the list of operations can include respective application nodes executing respective operations. In another example, entries within the list of operations can include respective times at which the processes began executing on the respective application nodes. In yet another example, entries within the list of operations can include respective amounts of memory used to process the respective operations.

In some implementations, the list of operations can be stored within a table. For example, the fast leak module 504 can transmit commands to a database associated with the application environment to create a new table to store a list of operations and insert new rows within the table for individual operations executed on the application server of the application environment. In another example, the fast leak module 504 can access a cache for storing the list of operations and/or other information associated with the operations executed on the application server of the application environment.

Responsive to identifying the list of operations, the leak remediation module 408 can remediate a memory leak detected by the fast leak module 504 by terminating operations of some or all of the listed operations. For example, the leak remediation module 408 can terminate the oldest operation(s) of the list of operations to remediate the memory leak. In another example, the leak remediation module 408 can terminate the operation in the list of operations that is using the largest amount of memory allotted to the application server 112. In yet another example, the leak remediation module 408 can determine weighted rankings for operations of the operation list (e.g., based on age, memory consumption, and/or other characteristics) and terminate those operation(s) present in the list that have the largest weighted ranking.

Responsive to terminating an operation, the leak remediation module 408 can determine a then-current total memory usage (e.g., a total amount of memory remaining consumed) within the application environment to identify whether the termination remediated the memory leak. For example, the leak remediation module 408 can compare a new memory usage resulting from the termination to the memory threshold such that, if the new memory usage is below the memory threshold, the memory leak can be determined to be remediated. In some implementations, responsive to a determination that terminating the operation did not remediate the memory leak, the leak remediation module 408 can repeat the termination process to terminate a next operation of the list of operations.

For example, where the leak remediation module 408 terminates an oldest operation and such termination alone does not free up enough memory to remediate the memory leak (e.g., to prevent the expected memory constraint from occurring), the leak remediation module 408 can continue terminating next respective oldest operations. In another example, where the leak remediation module 408 terminates an operation based on a largest amount of memory indicated as being utilized and such termination alone does not free up enough memory to remediate the memory leak, the leak remediation module 408 can continue terminating operations based on the next largest amounts of memory indicated as being utilized. The repeated operation termination can continue until the memory leak is determined to be remediated.

In the event the detected memory leak remains after the leak remediation module 408 terminates the operations, the leak remediation module 408 can perform further action to remediate the memory leak. In some implementations, the leak remediation module 408 can further remediate a memory leak detected by the fast leak monitor module 504 by terminating an application node executed by an application server of the application environment. For example, where data indicates that the memory leak is caused by, or likely attributed to, a particular application node executing by the application server, the leak remediation module 408 can transmit instructions to the application server to terminate that application node. In some implementations, terminating a node to remediate a memory leak can include resetting the application node by transmitting instructions to the application server to restart the application node after it has been terminated. In some implementations, terminating an application node to remediate a memory leak can include canceling processes executed by that application node.

In some implementations, the leak remediation module 408 can further remediate a memory leak detected by the fast leak monitor module 504 by resetting the application server of the application environment. For example, where data indicates that the memory leak is caused by, or likely attributed to, multiple application nodes executed by the application server, or where it is unclear as to the specific cause of the memory leak, the leak remediation module 408 can reset the application server to release the allotted memory consumed to execute the operations associated with the application environment. In some implementations, resetting the application server to remediate a memory leak can include the leak remediation module 408 transmitting a command to reset the application server to a physical server on which the application server operates.

In some implementations where multiple memory leaks are detected by the fast leak monitor 504 either at the same time or within a threshold time window (e.g., 1 minutes, 5 minutes, 10 minutes, 20 minutes, and so forth), the leak remediation module 408 can automatically reset the application server. Even where operations can still be terminated in attempt to remediate the memory leaks, a recent history of memory leaks detected by the fast leak monitor 504 can be indicative of an ineffectiveness of the leak remediation module 408 to remediate the memory leaks. As such, the application server can be reset to terminate executing operations and release consumed resources.

The slow leak monitor module 506 can include instructions for determining a time at which to trigger remediation based on the development of a detected developing memory leak. A memory leak detectable by the slow leak monitor module 506 can be a memory leak that occurs over multiple days, weeks, or longer, and steadily increases in size to a point where the memory leak causes a memory constraint within the application environment. Determining a time at which to trigger remediation can include using garbage collection operation data (e.g., received, generated, determined, or otherwise identified by the garbage collection module 404 of the memory monitor module 310) to identify a trend indicating the development of a memory leak. The identified trend can then be used to determine when the memory constraint would occur if the memory leak is not remediated.

Generally, a trend identifiable by the slow leak monitor module 506 shows some increase in memory use by the application server of the application environment over time without corresponding freeing of memory. In some implementations, a trend can be identified by first identifying operation runs corresponding to memory use that is not random, and then identifying steady changes in memory use over the identified operation runs during some time window. In some implementations, data received from the garbage collection module 404 can indicate a number of operations executed on the application server that are consuming memory allotted to the application environment.

The data identified from the garbage collection module 404 can be analyzed using a number of analysis principles to identify data points not related to operation runs. For example, one analysis principle can indicate that, when detecting a slowly developing memory leak, data from a garbage collection operation indicating that a minimum amount of memory is being used, or that a significant drop in memory use has occurred, can indicate that data being analyzed to identify a trend should be discarded. This is because a minimum amount of memory usage and/or a significant drop in memory use typically indicates that a related memory leak has been resolved, for example, because a transaction or script that was causing the memory leak has ended.

Data indicating a minimum amount of or a significant drop in memory use can be analyzed to identify trends in memory usage recovery, which can later be applied to other sets of garbage collection operation data. In some implementations, the value for defining a memory drop as being significant can be configured. In some implementations, identifying portions of non-random memory usage can include observing known memory drops and identifying situations where the ratio of memory recovered to the memory gained since the beginning of the respective memory drop exceeds a number of standard deviations above an average memory drop value.

In another example, another analysis principle can use statistical tests for evaluating the randomness of multi-valued data sequences, such as the Wald-Wolfowitz algorithm to detect where distributions of data received from the garbage collection module 404 have changed as compared to previous data received with respect to previous garbage collection operations. For example, the Wald-Wolfowitz algorithm can indicate that the data is random such that no trend or memory increase is discernable or that a current trend has changed (e.g., increased or decreased). If a sample is deemed random (i.e., no discernable trend), the "random" measurements may be replaced with the minimum observed value for the sample. In some implementations, other processes can be used in concert with the statistical tests to indicate when a trend starts, for example, by moving observations from one data set to another.

In some implementations, the relevance of data used for detecting memory leaks by the slow leak monitor module 506 can be determined by sorting the data identified from the garbage collection module 404 into bins. In some implementations, the size of a bin can be adjusted based on a number of data points to be analyzed for detecting a memory leak, such that slowly developing memory leaks can be detected over days, weeks, months, etc. In some implementations, the slow leak monitor module 506 can prune data stored in the bins to remove operation data that is not relevant or cannot be used for detecting a memory leak. For example, where no operation runs can be discerned for detecting a developing memory leak within some configurable period of time, the operation data associated with that period of time can be discarded. In some implementations, a most recent data point associated with a period of time can be retained for further trend analysis with a next set of garbage collection data. In some implementations, a portion of data within a bin can be replaced with minimum values of memory usage observed within the bin. In some implementations, data stored in a bin that is determined to be random (e.g., responsive a statistical test, such as the Wald-Wolfowitz algorithm) can be removed from the bin since the random data cannot be used to identify a trend in memory usage.

Once data relevant to the operation runs is identified, the relevant data can be modeled using a regression analysis to identify a trend. In some implementations, the modeling of the data using a regression analysis can be triggered once a configurable number of operation runs are identified. In some implementations, the modeling of the data using a regression analysis can be triggered once all of the data identified from the garbage collection module 404 has been analyzed to identify operation runs, regardless of a number of operation runs identified from the data. In some implementations, the regression analysis can be used to identify a confidence that the analyzed operation run data indicates a trend.

In some implementations, a trend can be identified based on steady changes in memory use by the operation runs. Steady changes in memory use can be identified based on increases in memory use over time that fit a regression pattern. In some implementations, the slow leak monitor module 506 can use linear regression to determine the operation runs relevant to identifying a trend based on slope of the linear regression.

For example, the operation runs might be inconsistent, so a trend identifiable amongst them can be identified by fitting the operation run data to a slope. A first time window can include a first set of operations that, at the beginning of the first window, use 0.7 gigabytes of the application server memory and, at the end of the first window, use 0.75 gigabytes. A second time window can include a second set of operations that, at the beginning of the second window, use 0.75 gigabytes of the application server memory and, at the end of the second window, use 1.2 gigabytes. A third time window can include a third set of operations that, at the beginning of the third window, use 1.2 gigabytes of the application server memory and, at the end of the third window, use 1.25 gigabytes. The first and third sets of operations fit a common slope representing a 0.05 gigabyte increase, whereas the second set of operations does not fit that common slope. Linear regression can be used to indicate a possible trend based on the first and third sets of operations. The confidence of the trend is higher where the first and third time windows are significantly larger than the second time window, such that the second time window measures inconsistent data over a small period of time.

Other types of regression analysis can also be used to identify trends. For example, a least squares analysis can be used to identify trends based on a number of data points of the operation runs intersecting squares representing steady changes in memory use. In another example, a logistic regression can be used to identify steady changes in memory use where the operation run data does not fit a linear regression.

In some implementations, data received from multiple garbage collection operations can be parsed where the performance of a regression analysis decreases. For example, it may be difficult to accurately process multiple large sets of data from multiple garbage collection operations using a single regression analysis since there can be a large number of irregularities in the data that do not fit a regression pattern. As such, it is possible that no trend will be identified using such large pools of data. Parsing the data into discrete time windows lets the slow leak monitor module 506 analyze more suitable, smaller sets of data using regression analysis. In some implementations, different regression analyses can be used with different sets of parsed data. In some implementations, for example where parsing the data would be too difficult or time consuming, the data received from the multiple garbage collection operations can be discarded.

Once a trend is identified, a future memory use can be projected based on the memory use increase represented by the trend to identify a predicted time at which the developing memory leak will cause a memory constraint within the application environment in the future. The projection of future memory use increase to the predicted time can be based on a rate of change indicating increases in memory use over time where the rate of change is based on or corresponds to the observed trend. In some implementations, the predicted time can be a time (e.g., represented as a four, six, or other digit timestamp) of a same day on which the memory leak is detected by the slow leak monitor module 506. In some implementations, the predicted time can be a time of a day falling after the day on which the memory leak is detected by the slow leak monitor module 506.

In some implementations, projecting the trend (e.g., by determining the projection of future memory use) to identify the predicted time includes extending a rate of change for the trend to a point where the total allocated memory allotted to the application environment exceeds a usability threshold. In some implementations, the usability threshold can be configured based on the types of operations executed by the application server, for example, such that the usability threshold can be higher where the average memory use by operations executed within the application environment is high and it can be low where the average memory use by operations executed within the application environment is low. In some implementations, whether an average memory use is high or low is determined by comparing the average memory use for operations executing within the application environment to a comparison threshold.

Responsive to determining the predicted time at which available memory will be below the usability threshold, the slow leak monitor module 506 can trigger remediation to reduce or eliminate the slow memory leak before the predicted time. In some implementations, the slow leak monitor module 506 can wait to trigger remediation by the leak remediation module 408 until the predicted time is within a threshold time interval from a then-current time, for example, one hour, 12 hours, or one day before the predicted time corresponding to a present or pending memory constraint. In some implementations where the slow leak monitor module 506 triggers remediation, the leak remediation module 408 can remediate the memory leak by identifying and terminating one or more operations that have executed since the beginning of the corresponding, identified trend as an initial remediation effort. In some implementations, where no operations have executed since the beginning of the corresponding, identified trend, the leak remediation module 408 can remediate the memory leak by identifying and terminating one or more longest executing operations of the trend as the initial remediation effort.

In the event the initial remediation effort does not remediate the memory leak, the leak remediation module 408 can remediate the memory leak by resetting the application server of the application environment. In some implementations, prior to triggering remediation or at a time proximate to triggering remediation, the slow leak module 506 can generate a message to be output to a user of a computing device indicating information about the memory leak. The message can include, for example, an identifier of the one or more operations causing the memory leak, an amount of memory then-currently allotted to operations within the application environment, and the predicted time at which the application environment will experience a memory constraint.

The reactive monitor module 502 of the leak detection module 406 can include instructions for detecting an in-progress memory leak and triggering remediation before the memory leak causes a memory constraint within the application environment. In some implementations, the reactive monitor 502 can detect an in-progress memory leak by comparing an amount of memory allocated within the application environment (e.g., by the application server) over a reactionary period to a memory threshold. The reactive monitor module 502 can have visibility into when the application server of the application environment performs a garbage collection operation. In some implementations, the reactive monitor module 502 can receive data from the garbage collection module 404 to determine memory usage for the application environment. As such, the amount of memory allocated within the application environment can be determined by the reactive monitor module 502 identifying results of a last garbage collection operation.

The memory threshold represents an upper bound limitation on consumed resources of the application server for triggering remediation via the reactive monitor module 502. In some implementations, the memory threshold can be a percentage of total resources allocated for use by the application server, for example, 90 percent of available memory. In some implementations, the memory threshold can be defined by a customer associated with the application environment that includes the application server. In some implementations, the memory threshold can be defined by a provider operating the datacenter at which the physical server operating the application server is located.

The reactionary period indicates a length of time to wait before triggering remediation responsive to the reactive monitor module 502 detecting memory leaks. In some implementations, the reactionary period can be associated with the memory threshold for determining whether the memory threshold has been met or exceeded for a defined length of time. For example, the reactionary period can be set to one minute such that, if the memory threshold is continuously met or exceeded throughout the one minute, the reactive monitor module 502 can trigger remediation. In some implementations, the reactionary period can indicate discrete time intervals for detecting memory usage. For example, the reactionary period can include three twenty second intervals such that, if the memory threshold is met or exceeded at least one time during each of the three intervals, the reactive monitor module 502 can trigger remediation.

In some implementations where the reactive monitor module 502 triggers remediation, the leak remediation module 408 can include identifying a list of operations executing within the application environment before the remediation was triggered. Implementations of identifying a list of operations are discussed above with respect to the fast leak module 504. Responsive to identifying the list of operations, the leak remediation module 408 can remediate a memory leak detected by the reactive monitor module 502 by terminating operations identified in the list of operations. Implementations of terminating operations of the list of operations are also discussed above with respect to the fast leak module 504. In the event the memory leak detected by the reactive monitor module 502 remains after operations are terminated, the leak remediation module 408 can perform further action to remediate the memory leak, including terminating application nodes executed by an application server of the application environment or resetting the application server. Implementations for further remediation actions performable by the leak remediation module 408 are discussed with respect to the fast leak module 504.

Implementations of the system depicted in FIG. 5 can include additional modules, fewer modules, combine modules, have modules with additional or less functionality than described above, and/or combinations thereof. For example, the system of FIG. 5 can include a threshold definition module including instructions for defining various thresholds used to detect memory leaks by the leak detection module 406. In another example, the system of FIG. 5 can include a simulation module including instructions for detecting developing and/or in-progress memory leaks from data points measured or observed on the application server over some period of time, which data points can include data identified from the garbage collection module 404 and/or data previously collected memory use data stored in a data warehouse, comma separated value file, log file, or other storage in memory. In some implementations, the data used by the simulation module can include fabricated memory use data generated for testing with the simulation module. In some implementations, trends detected using the simulation module can be used to detect memory leaks by the fast leak monitor module 504 and/or slow leak monitor module 506.

Figure 6A:
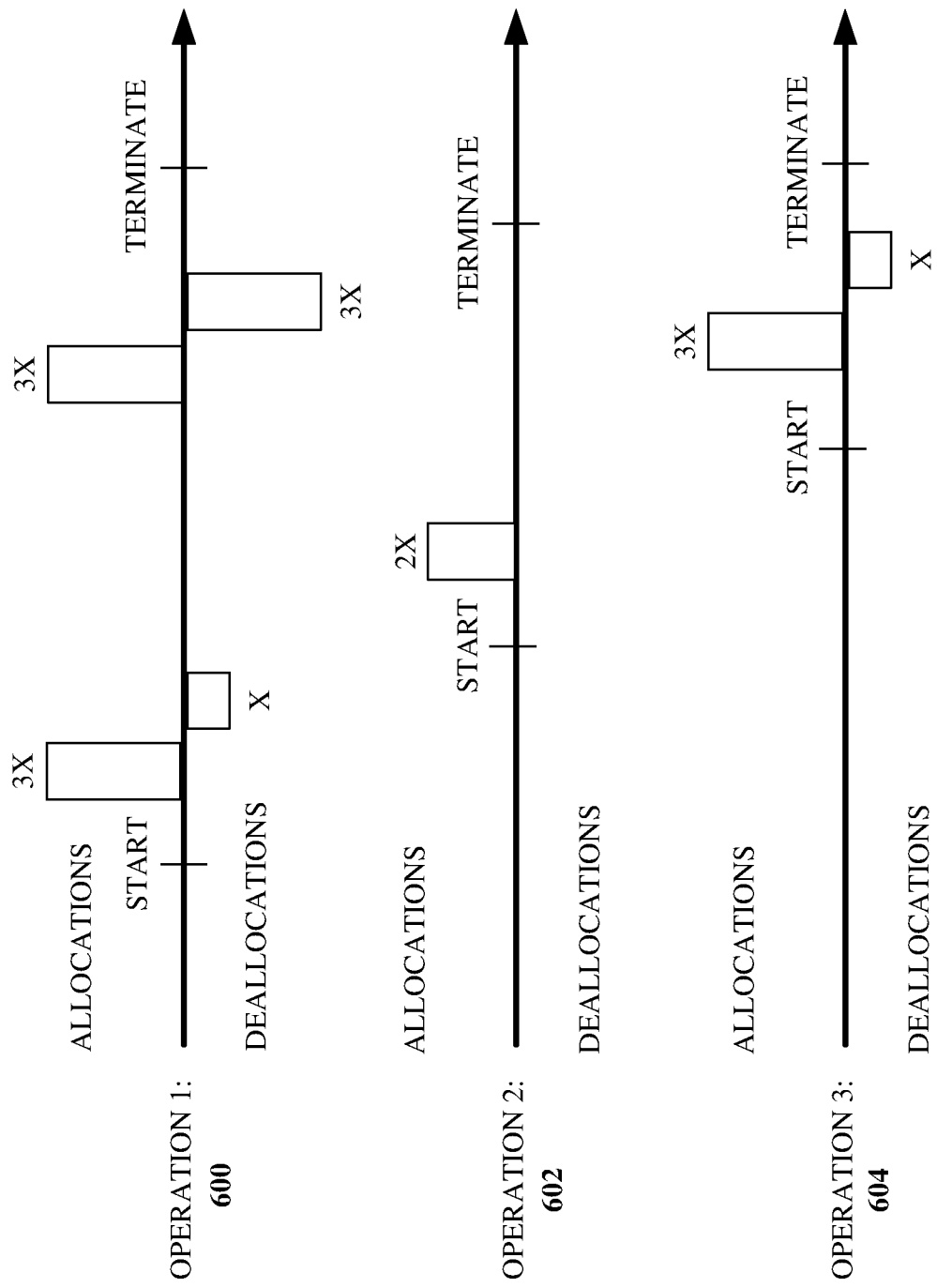
FIG. 6A is an illustration of examples of memory allocations and deallocations for operations executing within an application environment.

FIG. 6A is an illustration of examples of memory allocations and deallocations for operations executing within an application environment. Example memory allocations and deallocations discussed with respect to FIG. 6A include a variable X that can be any positive number. A first operation, Operation 1 600, executing at a first time, can be allocated 3X memory. Later, X memory can be deallocated and 3X allocated again. 3X memory can be deallocated as a final change to memory usage by Operation 1 600 before it is terminated. However, 2X memory remains allocated to Operation 1 600 even after it has been terminated. A second operation, Operation 2 602, executing at a second time after the first time at which Operation 1 600 started, can be allocated 2X memory without further change before it terminates. As such, Operation 2 602 also has 2X memory allocated to it after termination. A third operation, Operation 3 604, executing at a third time after the second time at which Operation 2 602 started, can be allocated 3X memory, deallocated X memory, and then terminate. Operation 3 604 therefore also has 2X memory allocated to it after it has been terminated.

Figure 6B:
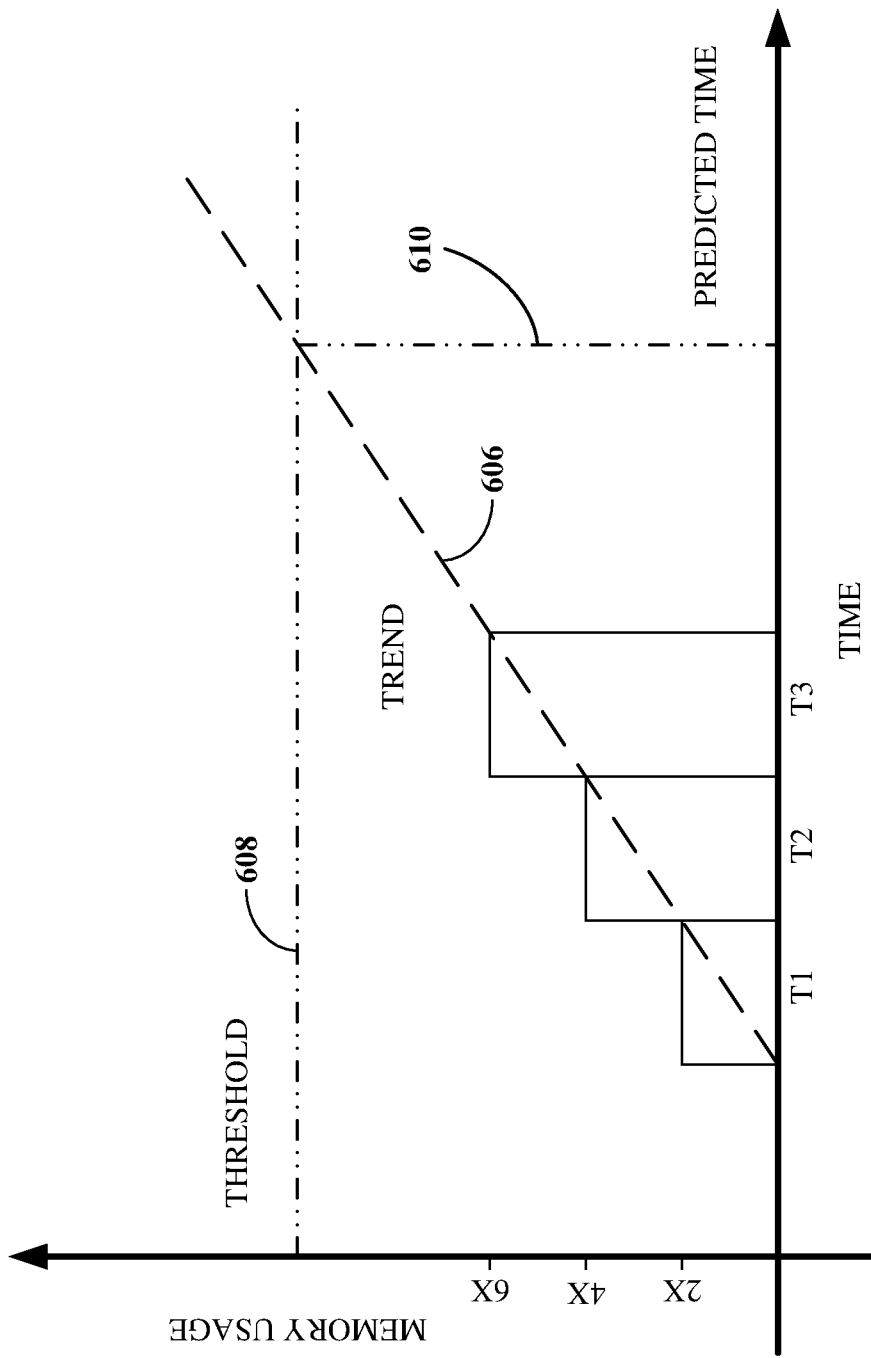
FIG. 6B is an illustration of an example of a trend identified based on the operations illustrated in FIG. 6A.

FIG. 6B is an illustration of an example of a trend 606 identified based on the operations illustrated in FIG. 6A. The trend 606 can be shown using a graph of memory usage over time during which an application environment operates. A threshold memory usage 608 can indicate a maximum amount of memory allotted to an application environment causes a memory constraint within the application environment when exceeded, for example, due to memory remaining allocated by terminated operations. Bars shown for individual times indicate a total memory usage as of those times. For example, time T1 can represent the second time at which Operation 2 602 executed, a time T2 can represent the third time at which Operation 3 604 executed, and a time T3 can represent a time at which Operation 3 604 terminated. At T1, the total memory allocated is 2X. At T2, the total memory allocated is 4X. At T3, the total memory allocated is 6X. The operation run of Operation 1 600, Operation 2 602, and Operation 3 604 can indicate that a trend of 2X memory allocation increases at respective times during the operation of the application environment. The trend 606 can be projected to determine a predicted time 610 at which the total allocated memory within the application environment is expected to exceed the threshold 608.

Although the examples referred to in FIGS. 6A and 6B include operations with a common (e.g., 2X) memory allocation after termination, a trend can be identified for operations with differing memory allocations after termination. For example, after respective terminations, Operation 1 can have 0.5X memory allocated, Operation 2 can have 2X memory allocated, and Operation 3 can have 2.75X memory allocated. If a high-enough confidence determination can be made that a trend exists based on those memory allocations, then the trend can be identified.

Figure 7:
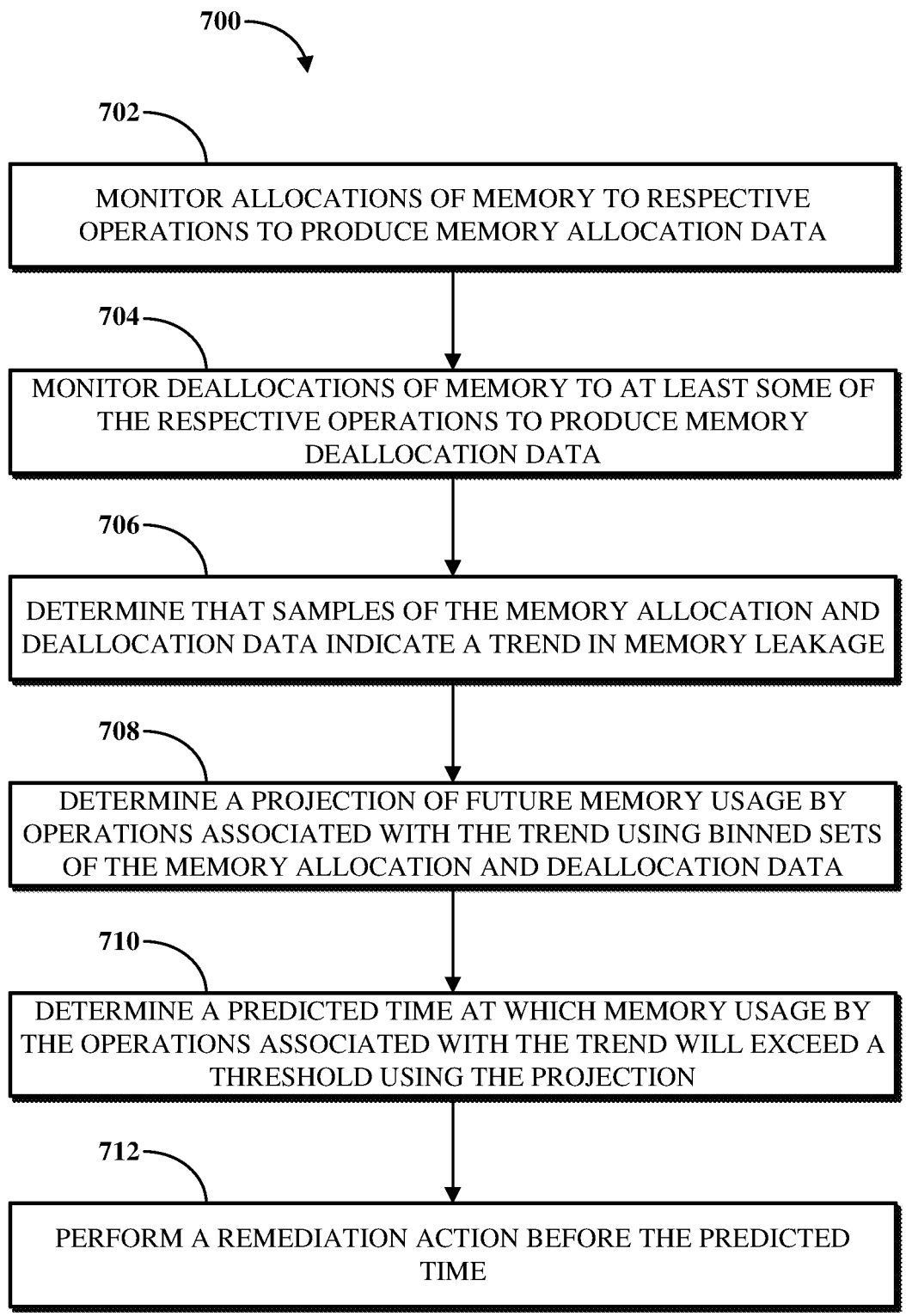
FIG. 7 is a flowchart illustrating an example of a technique for detecting and remediating developing memory leaks.
Figure 8:
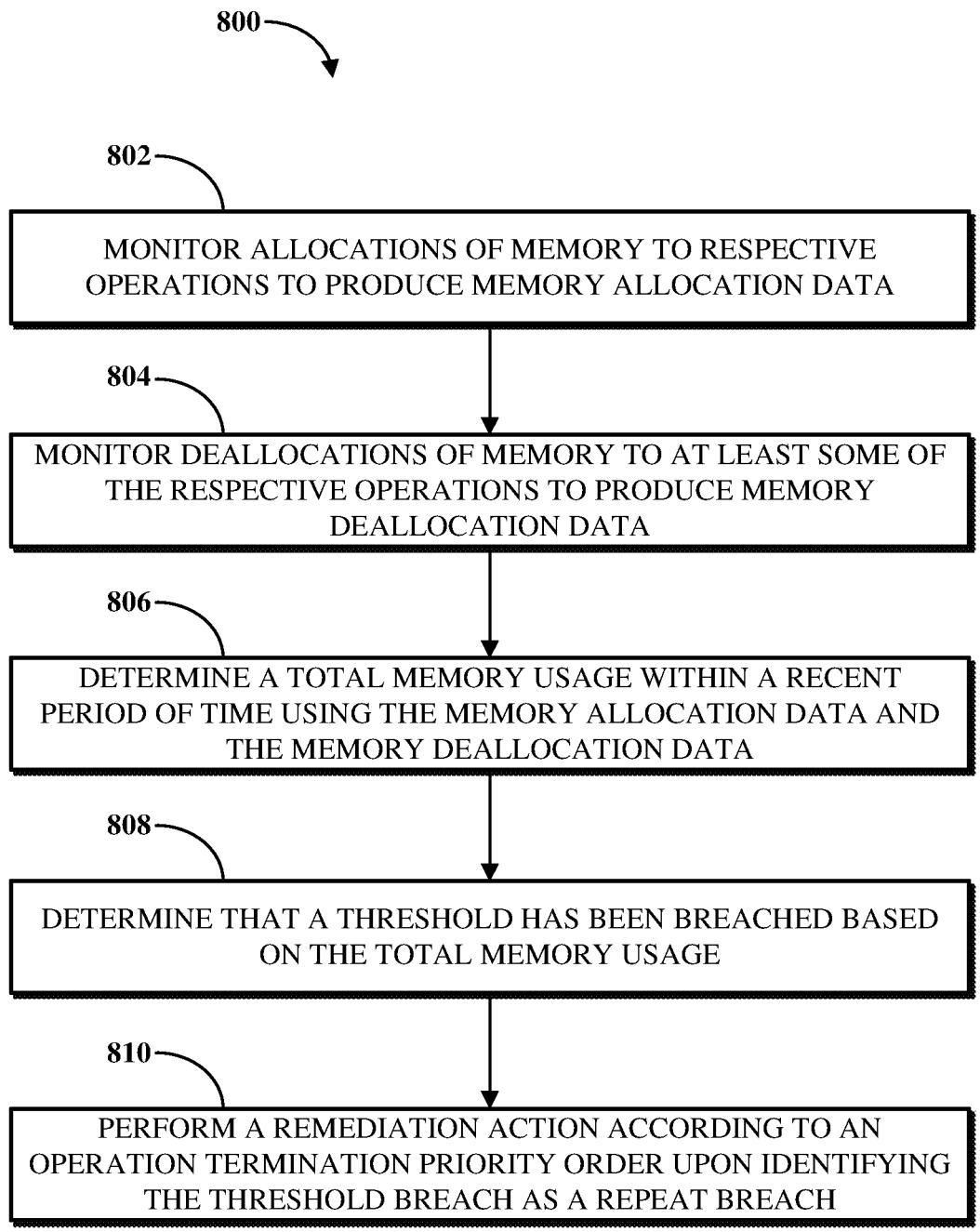
FIG. 8 is a flowchart illustrating an example of a technique for detecting and remediating in-progress memory leaks.

FIG. 7 is a flowchart illustrating an example of a technique 700 for detecting and remediating developing memory leaks, and FIG. 8 is a flowchart illustrating an example of a technique 800 for detecting and remediating in-progress memory leaks. In some implementations, the techniques 700 or 800 can be executed using computing devices, such as the equipment of FIGS. 1 through 3. In some implementations, the techniques 700 or 800 can be performed, for example, by executing a machine-readable program or other computer executable instructions, such as instructions or programs described according to JavaScript, C, or other such instructions. The steps, or operations, of the techniques 700 or 800 or another method, process, or algorithm described in connection with the implementations disclosed herein can be implemented directly in hardware, firmware, software executed by hardware, circuitry, or a combination of these.

Referring now to FIG. 7, in some implementations, the technique 700 includes monitoring allocations of memory to respective operations to produce memory allocation data 702, monitoring deallocations of memory to at least some of the respective operations to produce memory deallocation data 704, determining that samples of the memory allocation and deallocation data indicate a trend in memory leakage 706, determining a projection of future memory usage by operations associated with the trend using binned sets of the memory allocation data and the memory deallocation data 708, determining a predicted time at which memory usage by the operations associated with the trend will exceed a threshold using the projection of future memory usage 710, and performing a remediation action before the predicted time 712.

At 702, memory allocation data can be produced based on allocations of memory to respective operations executing within an application environment. In some implementations, the allocations of memory to the respective operations can include portions of memory allotted to the application environment, for example, by a physical server on which the application environment operates. A memory monitor module having visibility into the application environment can monitor the operations executed within the application environment, including identifying memory allocations to those operations. The memory allocation data can be indicative of total memory allocations for one or more operations of the respective operations. At 704, memory deallocation data can be produced based on deallocations of memory to at least some of the respective operations. In some implementations, the deallocations of memory can be identified by a garbage collection module having visibility into garbage collection software executed on or in the application environment. For example, an application server of the application environment can include software for performing garbage collection operations to recover memory allocated to operations that have terminated. The memory deallocation data can indicate the results of one or more garbage collection operations for one or more operations.

At 706, it can be determined that a trend in memory leakage is indicated by samples of the memory allocation data produced at 702 and the memory deallocation data produced at 704. As used herein, a "sample" or "sampled observation point" can refer to a memory usage value observed or otherwise measured within the application environment (e.g., by the allocation monitor module 400 or garbage collection module 404 shown in FIG. 4). In some implementations, the samples indicating the trend at 706 can be stored in a logical data structure, such as a bin described with respect to FIG. 5. The samples of memory deallocation data and the memory allocation data together can indicate a total amount of memory allotted to the application environment that remains allocated even after at least some of the respective operations have been terminated. In some implementations, the remaining allocated memory can be used to identify a trend of memory usage for projecting future memory usage within the application environment. For example, where the remaining allocated memory indicates that a fast memory leak exists within the application environment, a trend can be identified based on statistical values including a mean value indicating average memory use by operations executed within the application environment and a standard deviation for that memory use. In another example, where the remaining allocated memory indicates that a slow memory leak exists within the application environment, a trend can be identified based on operation runs associated with the memory allocation data and memory deallocation data and applying a regression analysis to the operation runs.

In some implementations, statistical analysis can be used to determine that samples of the memory allocation data and memory deallocation data indicate an operation run usable to identify the trend of memory usage (e.g., such that the samples do not indicate random values of memory usage). For example, a distribution of samples of memory allocation data and memory deallocation data can be identified responsive to a garbage collection operation. The distributions can be analyzed using a statistical test, such as the Wald-Wolfowitz algorithm, to determine whether the distribution of samples is random. If samples of the distribution of samples is random, that determination can indicate that those samples are not usable for identifying a trend in memory usage, for example, because those samples do not indicate an increase in memory usage. Those samples can then be removed from a binned set of memory allocation data and memory deallocation data responsive to the determination that the distribution of those samples is random.

At 708, a projection of future memory usage by the operations associated with the trend can be determined using binned sets of the memory allocation data and memory deallocation data. A slope of the trend can indicate a rate of change of memory usage by the operations associated with the trend. The rate of change can be used to determine how a future memory usage by those operations consistent with the observed memory usage thereof would affect total memory usage within the application environment. The future memory usage can be projected to a short-term time (e.g., one minute, one hour, or the like) or a long-term time (e.g., one day, three days, one week, one month, or the like) to indicate total memory usage by the operations associated with the trend at one or more future times.

At 710, a predicted time at which the memory usage by the operations associated with the trend will exceed a threshold can be determined using the projection of future memory usage determined at 708. In some implementations, where a fast memory leak is detected, a trend can be used to identify the predicted time as an imminent time or a time proximate to a current time at which the fast memory leak was identified. For example, the predicted time can be determined by comparing values of the trend indicating memory use by operations remaining in execution within the application environment after the corresponding garbage collection operation to the identified statistical values. In some implementations, where a slow memory leak is detected, a trend can be projected along with a rate of change indicating increases in memory use by operations of the operation runs over time to determine the predicted time. The projection can also indicate a period of time before the predicted time when the slow memory leak can be remediated without the application environment experiencing a memory constraint.

At 712, the memory leak can be remediated by performing a remediation action before the predicted time. In some implementations, the remediation action can include a termination of one or more operations executed within the application environment. For example, where the memory leak is a fast memory leak and the memory use value indicated by the trend exceeds a number (e.g., three) of standard deviations above the mean value of average memory use, remediation can be triggered to terminate an oldest operation executing within the application environment or an operation executing using a highest amount of memory allotted to the application environment. In another example, where the developing memory leak is a slow memory leak and the predicted time is within a period of time from a then-current time, remediation can be triggered to terminate an operation executing within the application environment for all or substantially all of the trend. In some implementations, the remediation action can include a reset of an application server of the application environment. For example, responsive to a determination that the memory leak has not been remediated after terminating one or more operations executed within the application environment, the application server operating within the application environment can be reset, such as by restarting the application server or a physical server operating the application server.

Referring now to FIG. 8, in some implementations, the technique 800 includes monitoring allocations of memory to respective operations to produce memory allocation data 802, monitoring deallocations of memory to at least some of the respective operations to produce memory deallocation data 804, determining a total memory usage within a recent period of time using the memory allocation data and the memory deallocation data 806, determining that a threshold has been breached based on the total memory usage 808, and performing a remediation action according to an operation termination priority order upon identifying the threshold breach as a repeat breach 810.

Implementations of 802 and 804 are discussed above with respect to the discussion of 702 and 704, respectively, of FIG. 7. At 806, a total memory usage of memory allotted to the application environment can be determined based on the memory allocation data produced at 802 and the memory deallocation data produced at 804. The total memory usage can indicate a total memory usage within a recent period of time relative to a time at which the determination is being made. For example, responsive to the memory deallocation data being produced based on a garbage collection operation performed for the application environment, the total memory usage can indicate memory remaining in use five minutes after the garbage collection operation was performed. At 808, the total memory usage can be compared to a threshold for memory use to determine whether the threshold has been reached. In some implementations, the threshold can represent a proportional (e.g., X %) or absolute (e.g., Y GB) amount of memory allotted to the application environment that, when exceeded, can cause or pose a risk of causing a memory constraint for the application environment. For example, the threshold can be configurably set to 95 percent of the total allotted memory of the application environment.

At 810, a remediation action can be performed upon identifying the breach of the threshold determined at 808 as a repeat breach of the threshold. For example, a repeat breach can be identified where multiple, consecutive garbage collection operations performed within a period of time (e.g., one hour, and of which the garbage collection operation resulting in the memory deallocation data at 804 is a most recently performed garbage collection operation of the multiple, consecutive garbage collection operations) indicate breaches of the threshold discussed at 808. That is, remediation of the detected memory leak can be triggered by identifying multiple occurrences of high memory use by the operations executing within the application environment. In some implementations, the remediation action performed can be determined based on a termination priority order for operations executing within the application environment. For example, the one or more operations can be terminated based on the duration the operation has been executing or highest memory use of the operations.

Although the techniques 700 and 800 are shown as series of operations for clarity, implementations of the techniques 700 or 800, or another method, process, or algorithm described in connection with the implementations disclosed herein, can be performed in various orders and/or concurrently. Additionally, operations in accordance with this disclosure can be performed with other operations not presented and described herein. Furthermore, one or more aspects of the systems and techniques described herein can be omitted. For example, the techniques 700 or 800 can include generating a message including information indicating the operations executing within the application environment responsive to respective garbage collection operations resulting in the data discussed at 702, 704, 802, and 804, and outputting the message to a display of a client device.

All or a portion of the implementations of the systems and techniques described herein can be implemented using a general-purpose computer/processor with a computer program that, when executed, carries out all or a portion of the respective techniques, algorithms, or instructions described herein. In addition, or alternatively, for example, a special-purpose computer/processor can be utilized which can contain specialized hardware for carrying out all or a portion of the techniques, algorithms, or instructions described herein.

The implementations of computing devices as described herein (and the algorithms, techniques, instructions, etc., stored thereon or executed thereby) can be realized in hardware, software, or a combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or another suitable circuit. In the claims, the term "processor" should be understood as encompassing the foregoing hardware, either singly or in combination.

For example, one or more computing devices can include an ASIC or programmable logic array such as a field-programmable gate array (FPGA) configured as a special-purpose processor to perform one or more of the operations described or claimed herein. An example FPGA can include a collection of logic blocks and random access memory (RAM) blocks that can be individually configured or configurably interconnected in order to cause the FPGA to perform certain functions. Certain FPGAs can contain other general- or special-purpose blocks as well. An example FPGA can be programmed based on a hardware definition language (HDL) design, such as VHSIC Hardware Description Language or Verilog.

The implementations disclosed herein can be described in terms of functional block components and various processing operations. Such functional block components can be realized by a number of hardware or software components that perform the specified functions. For example, the described implementations can employ various integrated circuit components, e.g., memory elements, processing elements, logic elements, look-up tables, and the like, which can carry out a variety of functions under the control of one or more microprocessors or other control devices. Similarly, where the elements of the described implementations are implemented using software programming or software elements, the systems and techniques can be implemented with a programming or scripting language, such as C, C++, Java, assembler, or the like, with the various algorithms being implemented with a combination of data structures, objects, processes, routines or other programming elements. Functional aspects can be implemented in algorithms that execute on one or more processors. Furthermore, the implementations of the systems and techniques could employ a number of conventional techniques for electronics configuration, signal processing or control, data processing and the like. The words "mechanism" and "element" are used broadly and are not limited to mechanical or physical implementations, but can include software routines in conjunction with processors, etc. Likewise, the term "module" or "monitor" as used herein and in the figures may be understood as corresponding to a functional unit implemented using software, hardware (e.g., an ASIC) or a combination of software and hardware. In certain contexts, such modules or monitors may be understood to be a processor-implemented software module or software-implemented monitor that is part of or callable by an executable program, which may itself be wholly or partly composed of such linked modules or monitors.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device. Other suitable mediums are also available. Such computer-usable or computer-readable media can be referred to as non-transitory memory or media, and can include RAM or other volatile memory or storage devices that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. An aspect or design described herein as "example" is not necessarily to be construed as preferred or advantageous over other aspects or designs. Rather, use of the word "example" is intended to present concepts in a concrete fashion. The use of examples, or language suggesting that an example is being described (e.g., "such as"), provided herein is intended merely to better illuminate the systems and techniques and does not pose a limitation on the scope of the systems and techniques unless otherwise claimed. As used in this application, the term "or" is intended to mean an inclusive "or" rather than an exclusive "or." That is, unless specified otherwise, or clearly indicated otherwise by the context, the statement "X includes A or B" is intended to mean a natural inclusive permutation thereof. For example, if X includes A; X includes B; or X includes both A and B, then "X includes A or B" is satisfied under any of the foregoing instances. In addition, the articles "a" and "an" as used in this application and the appended claims should generally be construed to cover both the singular and the plural unless specified otherwise or clearly indicated otherwise by the context to be directed to a singular form. Moreover, use of the term "an implementation" or the term "one implementation" throughout this disclosure is not intended to mean the same implementation or implementation unless described as such.

The particular implementations shown and described herein are illustrative examples of the systems and techniques and are not intended to otherwise limit the scope of the systems and techniques in any way. For the sake of brevity, conventional electronics, control systems, software development and other functional aspects of the systems (and components of the individual operating components of the systems) cannot be described in detail. Furthermore, the connecting lines, or connectors shown in the various figures presented are intended to represent example functional relationships or physical or logical couplings between the various elements. Many alternative or additional functional relationships, physical connections or logical connections can be present in a practical device. Moreover, no item or component is essential to the practice of the systems and techniques unless the element is specifically described as "essential" or "critical."

The use of the terms "including," "comprising," "having," or variations thereof herein is meant to encompass the items listed thereafter and equivalents thereof as well as additional items. Unless specified or limited otherwise, the terms "mounted," "connected," "supported," "coupled," or variations thereof are used broadly and encompass both direct and indirect mountings, connections, supports, and couplings. Further, "connected" and "coupled" are not restricted to physical or mechanical connections or couplings.

Unless otherwise indicated herein, the recitation of ranges of values herein is merely intended to serve as a shorthand alternative to referring individually to respective separate values falling within the range, and respective separate values are incorporated into the specification as if individually recited herein. Finally, the operations of all techniques described herein are performable in any suitable order unless clearly indicated otherwise by the context.

All references, including publications, patent applications, and patents, cited herein are hereby incorporated by reference to the same extent as if the references were individually and specifically indicated as incorporated by reference and were set forth in its entirety herein.

The above-described implementations have been described in order to facilitate easy understanding of the present systems and techniques, and such descriptions of such implementations do not limit the present systems and techniques. To the contrary, the present systems and techniques are intended to cover various modifications and equivalent arrangements included within the scope of the appended claims, which scope is to be accorded the broadest interpretation as is permitted by law so as to encompass all such modifications and equivalent arrangements.

What is claimed is:

1. A system, comprising:
a processor; and
a memory, wherein the memory stores instructions that, when executed by the processor, cause the processor to perform operations comprising:
executing a recovery operation to recover one or more allocations of memory utilized by respective operations that have terminated within an application environment;
determining that a total amount of available memory associated with the application environment is less than a threshold amount of memory after execution of the recovery operation;
in response to determining that the total amount of available memory associated with the application environment is less than the threshold amount of memory after execution of the recovery operation, determining that a developing memory leak or an in-progress memory leak is occurring within the application environment; and
in response to a determination that the developing memory leak is occurring within the application environment, terminating a first operation executing throughout a trend of memory usage associated with the application environment; or
in response to a determination that the in-progress memory leak is occurring within the application environment, terminating a second operation in the application environment that is the oldest executing operation in the application environment or terminating the operation that uses the most amount of memory in the application environment.

2. The system of claim 1, wherein the trend of memory usage associated with the application environment is identified based on allocations of memory to respective additional operations executing within the application environment and deallocations of memory associated with the respective additional operations.

3. The system of claim 1, wherein the operations comprise:
in response to the determination that the developing memory leak is occurring within the application environment:
determining a predicted time at which memory usage by additional operations executing within the application environment is expected to exceed a threshold amount of memory usage indicative of a memory constraint; and
terminating the first operation executing throughout the trend before the predicted time.

4. The system of claim 3, wherein the operations comprise determining that the developing memory leak is a fast memory leak based on the predicted time, and wherein the first operation is the oldest executing operation in the application environment or the operation that uses the most amount of memory in the application environment.

5. The system of claim 1, wherein the determination that the developing memory leak is occurring comprises identifying an increase in allocations of memory to respective additional operations in the application environment over a period of time without a corresponding increase in deallocations of memory associated with the respective additional operations over the period of time.

6. The system of claim 1, wherein:
determining that the developing memory leak or the in-progress memory leak is occurring comprises determining that the in-progress memory leak is occurring; and
in response to the determination that the in-progress memory leak is occurring, terminating the second operation in the application environment that is the oldest operation in the application environment or terminating the operation that uses the most amount of memory in the application environment.

7. The system of claim 1, wherein:
determining that the developing memory leak or an the in-progress memory leak is occurring comprises determining that the developing memory leak is occurring; and
in response to the determination that the developing memory leak is occurring, terminating the first operation executing throughout the trend of memory usage associated with the application environment.

8. The system of claim 1, wherein the operations comprise:
in response to the determination that the developing memory leak is occurring within the application environment:
determining a predicted time at which memory usage by additional operations executing within the application environment is expected to exceed a threshold amount of memory usage indicative of a memory constraint;
determining that the developing memory leak is a fast memory leak based on the predicted time; and
remediating the fast memory leak by resetting the application environment to release memory consumed by the additional operations executing within the application environment.

9. A method, comprising:
executing a recovery operation to recover one or more allocations of memory utilized by respective operations that have terminated within an application environment;
determining whether a total amount of available memory associated with the application environment is less than an average amount of memory utilized by operations executing within the application environment after execution of the recovery operation;
determining whether a developing memory leak or an in-progress memory leak is occurring within the application environment in response to a determination that the total amount of available memory is less than the average amount of memory utilized by the operations executing within the application environment after execution of the recovery operation; and
in response to a determination that the developing memory leak is occurring within the application environment, terminating a first operation executing throughout a trend of memory usage associated with the application environment; or
in response to a determination that the in-progress memory leak is occurring within the application environment, terminating a second operation in the application environment that is the oldest executing operation in the application environment or terminating the operation that uses the most amount of memory in the application environment.

10. The method of claim 9, wherein the recovery operation is periodically executed against the application environment.

11. The method of claim 9, wherein the determination that the in-progress memory leak is occurring comprises identifying a pattern of high memory usage over an additional period of time.

12. The method of claim 9, comprising:
   determining that the developing memory leak or the in-progress memory leak is still occurring after terminating the first operation or the second operation; and
   restarting an application server associated with the application environment.

13. The method of claim 9, comprising:
   determining that the developing memory leak is still occurring after terminating the first operation; and
   terminating an additional operation executing throughout the trend.

14. The method of claim 9, wherein determining whether the developing memory leak or the in-progress memory leak is occurring comprises determining that the developing memory leak is occurring, and wherein the method comprises:
   performing a regression analysis against data associated with the respective operations that have been terminated within the application environment;
   identifying a trend based on the regression analysis;
   determining a projection of future memory usage based on an increase in memory use represented by the trend; and
   identifying a predicted time at which the developing memory leak will cause a memory constraint within the application environment based on the projection.

15. A non-transitory, computer-readable medium, comprising machine-readable instructions that, when executed by a processor, cause the processor to perform operations comprising:
   executing a recovery operation to recover one or more allocations of memory utilized by respective operations that have terminated within an application environment;
   determining that a total amount of available memory associated with the application environment is less than a threshold amount of memory after execution of the recovery operation;
   in response to determining that the total amount of available memory associated with the application environment is less than the threshold amount of memory after execution of the recovery operation, determining that a developing memory leak or an in-progress memory leak is occurring within the application environment;
   in response to a determination that the developing memory leak is occurring within the application environment, terminating a first operation executing throughout a trend of memory usage associated with the application environment; or
   in response to a determination that the in-progress memory leak is occurring within the application environment, terminating a second operation in the application environment that is the oldest executing operation in the application environment or the operation that uses the most amount of memory in the application environment;
   determining that the developing memory leak or the in-progress memory leak is still occurring after terminating the first operation, terminating the oldest executing operation, or terminating the executing operation using the most amount of memory; and
   restarting an application node associated with the application environment.

16. The non-transitory, computer-readable medium of claim 15, wherein a load balancer is configured to direct one or more operations associated with a client device to an additional application node while the application node is restarting.

17. The non-transitory, computer-readable medium of claim 16, wherein the operations comprise determining that the developing memory leak or the in-progress memory leak is still occurring after the load balancer has directed the one or more operations to the additional application node.

18. The non-transitory, computer-readable medium of claim 17, wherein the operations comprise restarting an application server associated with the application node and the additional application node.

19. The non-transitory, computer-readable medium of claim 15, wherein the operations comprise monitoring allocations of memory to respective operations executing within the application environment and deallocations of memory associated with the respective operations.

20. The non-transitory, computer-readable medium of claim 19, wherein determining that the developing memory leak or the in-progress memory leak is occurring within the application environment is based on the allocations of memory to the respective operations and the deallocations of memory to the respective operations.

* * * * *

UNITED STATES PATENT AND TRADEMARK OFFICE
CERTIFICATE OF CORRECTION

| | |
|---|---|
| PATENT NO. | : 11,455,125 B2 |
| APPLICATION NO. | : 17/065165 |
| DATED | : September 27, 2022 |
| INVENTOR(S) | : Carmine Mangione-Tran |

It is certified that error appears in the above-identified patent and that said Letters Patent is hereby corrected as shown below:

In the Claims

Column 30, Claim 7, Line 13, delete the word "an".

Signed and Sealed this
Twenty-first Day of February, 2023

*Katherine Kelly Vidal*

Katherine Kelly Vidal
*Director of the United States Patent and Trademark Office*